United States Patent
Hamm

(10) Patent No.: US 11,939,057 B2
(45) Date of Patent: Mar. 26, 2024

(54) UAV ENABLED VEHICLE PERIMETERS

(71) Applicant: Mark Hamm, Germantown, TN (US)

(72) Inventor: Mark Hamm, Germantown, TN (US)

(73) Assignee: Mark Hamm, Germantown, TN (US)

(*) Notice: Subject to any disclaimer, the term of this patent is extended or adjusted under 35 U.S.C. 154(b) by 319 days.

(21) Appl. No.: 17/184,010

(22) Filed: Feb. 24, 2021

(65) Prior Publication Data
US 2022/0144166 A1 May 12, 2022

Related U.S. Application Data

(60) Provisional application No. 63/114,219, filed on Nov. 16, 2020, provisional application No. 63/112,439, filed on Nov. 11, 2020.

(51) Int. Cl.
*B64C 39/02* (2023.01)
*B64U 80/86* (2023.01)
*B64U 101/55* (2023.01)

(52) U.S. Cl.
CPC ............ *B64C 39/024* (2013.01); *B64U 80/86* (2023.01); *B64U 2101/55* (2023.01)

(58) Field of Classification Search
CPC ........................... B64U 80/86; B64U 2101/55
See application file for complete search history.

(56) References Cited

U.S. PATENT DOCUMENTS

| | | | |
|---|---|---|---|
| 4,952,910 | A | 8/1990 | Straten et al. |
| 9,235,210 | B2 | 1/2016 | Zhang |

(Continued)

FOREIGN PATENT DOCUMENTS

| | | |
|---|---|---|
| CN | 208006848 U | 10/2018 |
| CN | 210191843 U | 3/2020 |

(Continued)

OTHER PUBLICATIONS

PCT International Search Report and Written Opinion, Application No. PCT/US2021/058685, dated Mar. 17, 2022.

*Primary Examiner* — Jessica B Wong
(74) *Attorney, Agent, or Firm* — MacMillan, Sobanski & Todd, LLC

(57) ABSTRACT

The technical description relates to perimeters for vehicles. Specific examples relate to vehicle perimeters established by unmanned aerial vehicles (UAVs), such as autonomous drones, for a variety of vehicle types, including manually-driven, partially autonomous, and fully autonomous vehicles. Perimeter devices, vehicles, including autonomous vehicles and human-controlled vehicles, UAVs, and related systems and methods are described. Perimeter devices respond to triggering events, such as vehicle-immobilizing events, GPS-based events, and environment-based events, to establish a perimeter adjacent a vehicle such that observers can visually detect the presence of a signal member, such as a warning triangle having a reflective surface. An example vehicle includes a tractor unit, a trailer connected to the tractor unit, a storage enclosure associated with the tractor unit, and a plurality of perimeter devices disposed in the chamber. Each perimeter device of the plurality of perimeter devices includes a triangular signal member, a base member, and a UAV. Each perimeter device is adapted to deploy from the chamber and establish a perimeter by the vehicle in response to a triggering event, such as parking of the vehicle in a location for which a perimeter must be established, impact of the vehicle with another object, such as during a traffic accident, rollover of the vehicle, or mechanical and/or electrical failure of the vehicle.

20 Claims, 18 Drawing Sheets

(56) References Cited

U.S. PATENT DOCUMENTS

| | | |
|---|---|---|
| 9,902,317 B1 | 2/2018 | Chuang et al. |
| 9,927,811 B1 | 3/2018 | Tseng et al. |
| 9,972,205 B2 | 5/2018 | Beaulieu |
| 10,134,290 B2 | 11/2018 | Mikan et al. |
| 10,145,684 B1 | 12/2018 | Tofte et al. |
| 10,152,059 B2 | 12/2018 | Banerjee et al. |
| 10,223,914 B2 | 3/2019 | Park |
| 10,467,885 B2 | 11/2019 | Trundle et al. |
| 2007/0189028 A1 | 8/2007 | Chen |
| 2015/0370251 A1 | 12/2015 | Siegel et al. |
| 2017/0129603 A1 | 5/2017 | Raptopoulos et al. |
| 2018/0354417 A1 | 12/2018 | Parissi |
| 2018/0363255 A1 | 12/2018 | Tseng et al. |
| 2019/0177935 A1 | 6/2019 | Kim et al. |
| 2020/0102093 A1 | 4/2020 | Claridge et al. |

FOREIGN PATENT DOCUMENTS

| | | | |
|---|---|---|---|
| CN | 211107160 U | 7/2020 | |
| DE | 102010046522 A1 | 5/2011 | |
| KR | 20120046518 A | 5/2012 | |
| WO | WO-2017082903 A1 * | 5/2017 | ............... B60Q 1/52 |
| WO | 2018209375 A1 | 11/2018 | |

\* cited by examiner

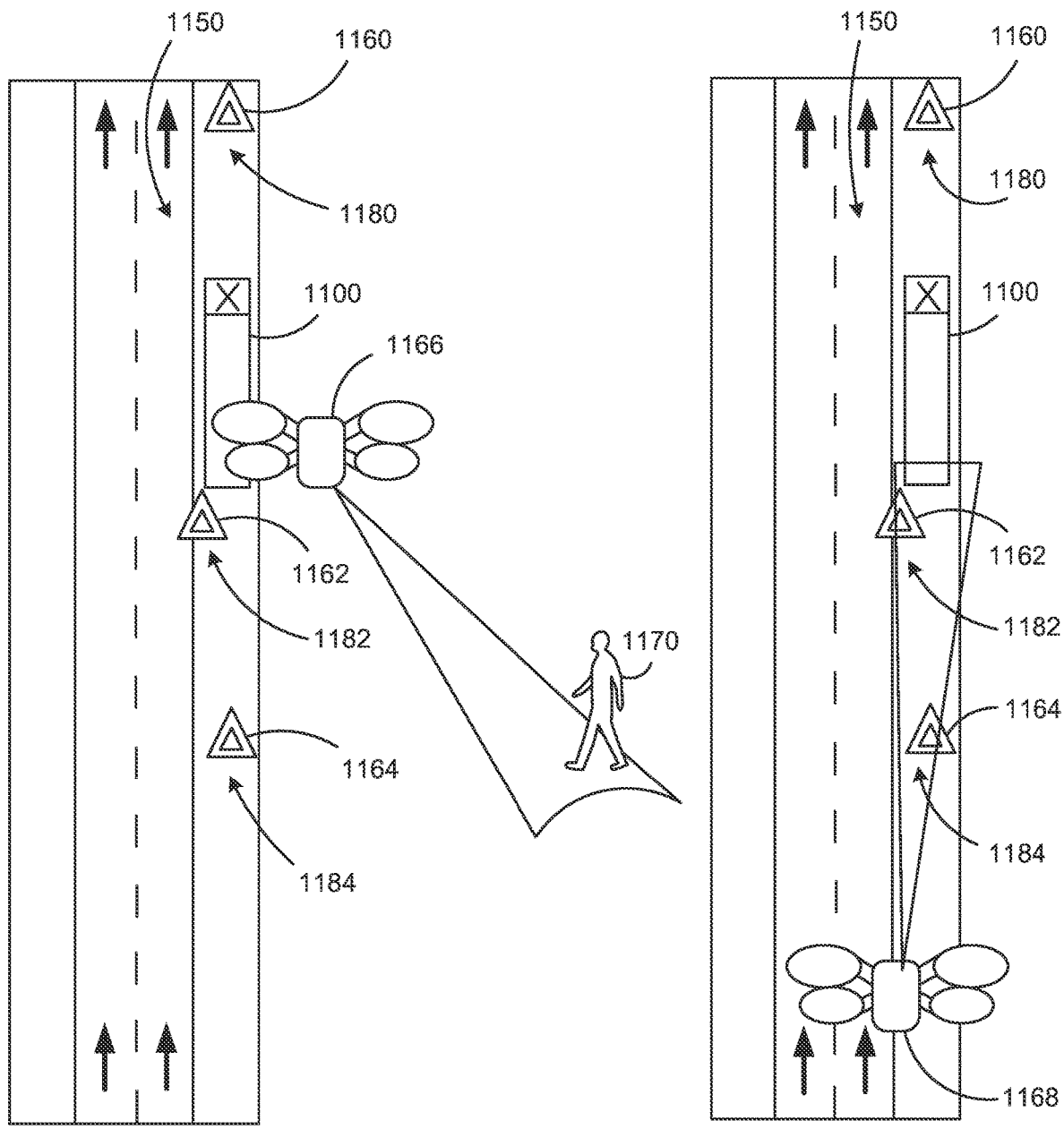

UAV ENABLED VEHICLE PERIMETERS

CROSS-REFERENCE TO RELATED APPLICATIONS

This application claims priority to U.S. provisional application No. 63/112,439, filed on Nov. 11, 2020, and U.S. provisional application No. 63/114,219, filed on Nov. 16, 2020, the entire contents of each of which is incorporated into this disclosure.

FIELD

The disclosure relates to the field of perimeters for vehicles. More particularly, the disclosure relates to vehicle perimeters established by unmanned aerial vehicles (UAVs), such as autonomous drones. Specific examples described herein relate to perimeter devices, vehicles, including autonomous vehicles and human-controlled vehicles, UAVs, and related systems and methods. The perimeters enabled by the various inventions can be established for various purposes, including safety, security, data collection, communications, logistical delivery and/or resupply, and environmental control.

BACKGROUND

Vehicles of all types are in continuous development, with sizes, weights, and configurations changing frequently. Furthermore, autonomous functionality is available or in late-stage development for many types of vehicles, including passenger cars, delivery vans and trucks, and cargo trucks. As vehicles change, and as roads, sidewalks, and safety support systems change in response, traditional perimeters for vehicles will become inadequate for establishing effective perimeters when such vehicles become disabled or otherwise temporarily immobile. Furthermore, the development of new perimeter technology provides an opportunity to extend the function of vehicle perimeters beyond those typically served by conventional perimeters.

A need exists, therefore, for improved perimeters for vehicles and related devices, systems, and methods.

BRIEF SUMMARY OF SELECTED EXAMPLES

Various example perimeter devices are described.

An example perimeter device comprises a signal member, a base member movably connected to the signal member, a connector disposed on the signal member, and a UAV connected to the connector. The perimeter device has a non-deployed configuration and a deployed configuration.

Another example perimeter device comprises a signal member, a base member movably connected to the signal member, a connector disposed on the signal member, and a UAV connected to the connector such the UAV is movable from a first position that is substantially within an opening defined by the signal member to a second position that is substantially external to the opening. The perimeter device has a non-deployed configuration and a deployed configuration.

Another example perimeter device comprises a signal member and a UAV that includes a frame that provides a base member. The signal member is movably connected to the frame of the UAV. The signal member has multiple sides, and the frame of the UAV has multiple sides. The UAV has propellers positioned at the vertices formed by the sides of the frame. The perimeter device has a non-deployed configuration and a deployed configuration.

Another example perimeter device comprises a UAV having a triangular frame defined by first, second, and third sides that cooperatively define an opening. The UAV has propellers positioned at the vertices formed by the sides of the frame. The UAV includes a storage bay positioned in the opening defined by sides of the frame and covering. A hook is attached to the covering and extends downward. A plurality of signal members is positioned in the storage bay, arranged as a stack with individual signal members positioned in a plane that is parallel to the plane in which the frame is disposed. Each signal member of the plurality of signal members includes a loop through which the hook extends. Individual signal members of the plurality of signal members are adapted to be released from the hook and storage bay for deployment and include support legs that extend outward upon release of the signal member.

Various vehicles are described.

An example vehicle comprises a passenger automobile and includes a storage enclosure disposed on the undercarriage of the vehicle and defining a chamber. A movable door provides selective ingress and egress to the chamber. A perimeter device according to an embodiment is positioned within the chamber when the vehicle is in a perimeter device storage configuration. The perimeter device is secured to the storage enclosure.

Another example vehicle comprises a semi-trailer truck, and includes a tractor unit and a trailer. The vehicle also includes a storage enclosure disposed on a surface of the tractor unit, such as the uppermost surface. The storage enclosure defines a chamber and a movable door that provides selective ingress and egress to the chamber. A plurality of perimeter devices is positioned within the chamber when the vehicle is in a perimeter device storage configuration. Each perimeter device of the plurality of perimeter devices is a perimeter device according to an embodiment of the invention and is secured to the storage enclosure.

Various vehicle perimeter systems are described herein.

An example vehicle perimeter system comprises a vehicle, a remote computing resource, and at least one UAV adapted to be mounted on and deployed from the vehicle and to communicate with the remote computing resource. The UAV is a component of a perimeter device according to an embodiment.

Another example vehicle perimeter system comprises a vehicle and at least one UAV mounted on the vehicle in a designated mounting area. The UAV is deployable from the vehicle when the vehicle, or a driver or remote operator of the of the vehicle, transmits a signal to the UAV indicating that the vehicle is temporarily immobilized, such as during a rollover or other event. The UAV is configured to survey the environment immediately surrounding the vehicle and determine optimal positioning for one or more perimeter devices near the vehicle during its period of immobilization. In some embodiments, the UAV is configured to fly to the determined position, or one of the determined positions, and to release a perimeter device it is carrying, such as a cone, reflective triangle, flare, light, communications beacon, or the like, at the determined position. In other embodiments, the UAV has a configuration in which it functions as a perimeter device. In these embodiments, the UAV is configured to fly to the determined position, or one of the determined positions, and to adopt its perimeter device configuration, and then place itself at the determined position. The UAV is configured to leave the determined position, and leave its perimeter device configuration if appropriate, when the vehicle, or a driver or remote operator of the vehicle, transmits a signal to the UAV indicating that the vehicle is no longer temporarily immobilized. Once this signal is received, the UAV leaves the determined position and flies to the vehicle, ultimately mounting itself on the designated mounting area on the vehicle.

Various methods of establishing a vehicle perimeter are described herein.

An example method of establishing a vehicle perimeter comprises operating a vehicle having at least one perimeter device associated with the vehicle according to an embodiment; deploying the perimeter device from the vehicle by operating the UAV component of the perimeter device; and positioning the perimeter device at a predetermined location relative to the vehicle to establish the safety perimeter. An optional step comprises returning the perimeter device to the vehicle such that the perimeter device is again associated with the vehicle. The steps of deploying the perimeter device and positioning the perimeter device at the predetermined location can be repeated any suitable number of times, each using a new and different predetermined location, based on the number of perimeter devices associated with the vehicle.

Another example method of establishing a vehicle perimeter comprises operating a vehicle having at least one perimeter device associated with the vehicle according to an embodiment; deploying the perimeter device from the vehicle by operating the UAV component of the perimeter device; acquiring information relating to one or more situational parameters by the UAV component of the perimeter device; and positioning the perimeter device at a predetermined location relative to the vehicle to establish the safety perimeter. An optional step comprises returning the perimeter device to the vehicle such that the perimeter device is again associated with the vehicle. The steps of deploying the perimeter device and positioning the perimeter device at the predetermined location can be repeated any suitable number of times, each using a new and different predetermined location, based on the number of perimeter devices associated with the vehicle.

Another example method of establishing a vehicle perimeter comprises operating a vehicle having at least one perimeter device associated with the vehicle according to an embodiment; deploying the perimeter device from the vehicle by operating the UAV component of the perimeter device; acquiring information relating to one or more situational parameters by the UAV component of the perimeter device; positioning the perimeter device at a predetermined location relative to the vehicle to establish the safety perimeter; and acquiring information relating to one or more safety perimeter parameters by the UAV component of the perimeter device. An optional step comprises returning the perimeter device to the vehicle such that the perimeter device is again associated with the vehicle. The steps of deploying the perimeter device and positioning the perimeter device at the predetermined location can be repeated any suitable number of times, each using a new and different predetermined location, based on the number of perimeter devices associated with the vehicle.

Additional understanding of the inventive improved perimeters for vehicles and related devices, methods, and systems can be obtained by reviewing the detailed description of selected examples, below, with reference to the appended drawings.

DESCRIPTION OF FIGURES

FIG. 31 is a top view of the vehicle and deployed vehicle perimeter illustrated in FIG. 30.

FIG. 32 is another top view of the vehicle and deployed vehicle perimeter illustrated in FIG. 30.

DESCRIPTION OF SELECTED EXAMPLES

Figure 1:
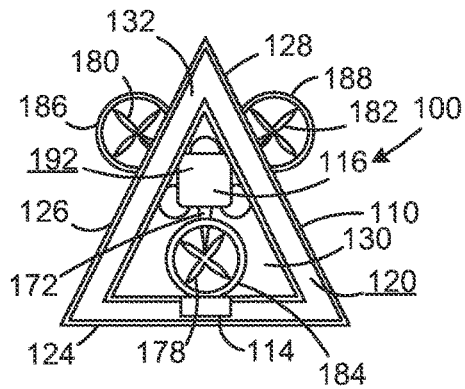
FIG. 1 is a top view of an example perimeter device. The perimeter device is illustrated in a non-deployed configuration.
Figure 2:
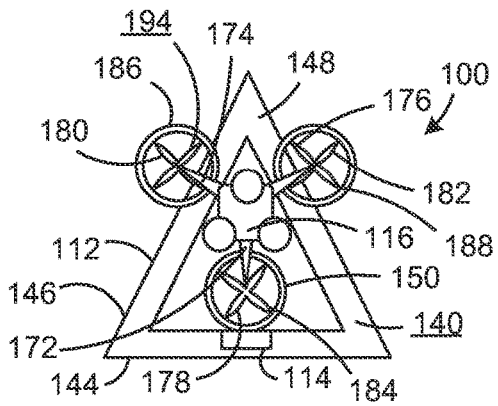
FIG. 2 is a bottom view of the perimeter device illustrated in FIG. 1. The perimeter device is illustrated in a non-deployed configuration.
Figure 3:
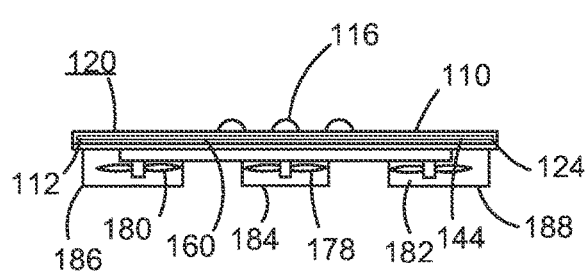
FIG. 3 is a side view of the perimeter device illustrated in FIG. 1. The perimeter device is illustrated in a non-deployed configuration.
Figure 4:
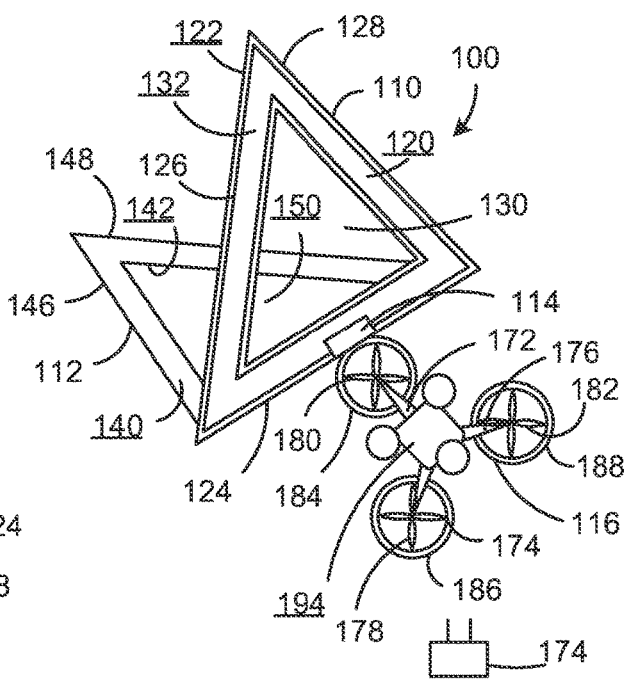
FIG. 4 is a perspective view of the perimeter device illustrated in FIG. 1. The perimeter device is illustrated in a deployed configuration.
Figure 5:
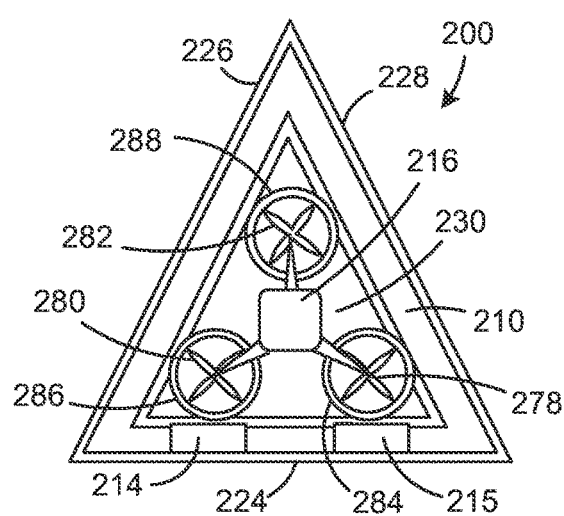
FIG. 5 is a top view of another example perimeter device. The perimeter device is illustrated in a non-deployed configuration.
Figure 6:
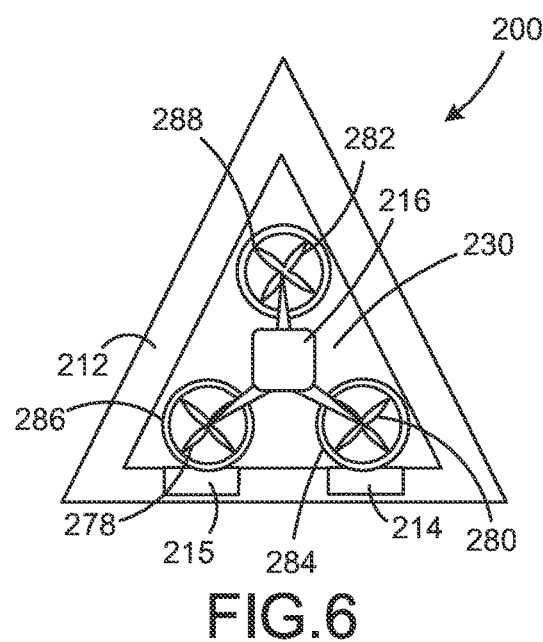
FIG. 6 is a bottom view of the perimeter device illustrated in FIG. 5. The perimeter device is illustrated in a non-deployed configuration.
Figure 7:
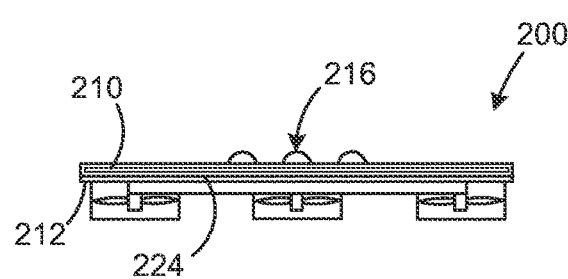
FIG. 7 is a side view of the perimeter device illustrated in FIG. 5. The perimeter device is illustrated in a non-deployed configuration.
Figure 8:
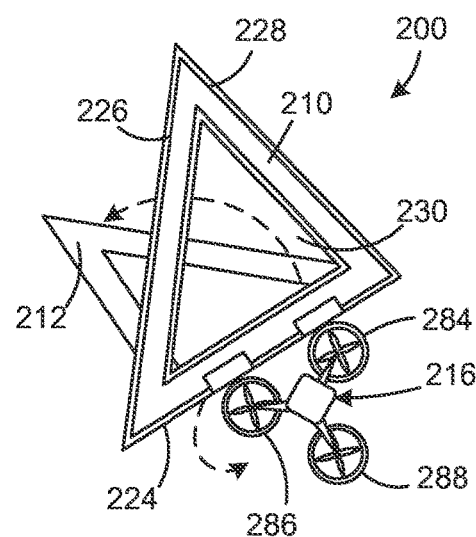
FIG. 8 is a perspective view of the perimeter device illustrated in FIG. 5. The perimeter device is illustrated in a deployed configuration.
Figure 9:
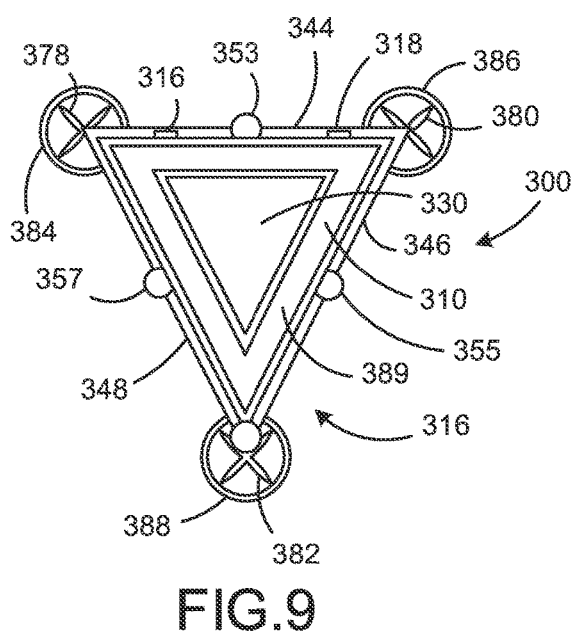
FIG. 9 is a top view of another example perimeter device. The perimeter device is illustrated in a non-deployed configuration.
Figure 10:
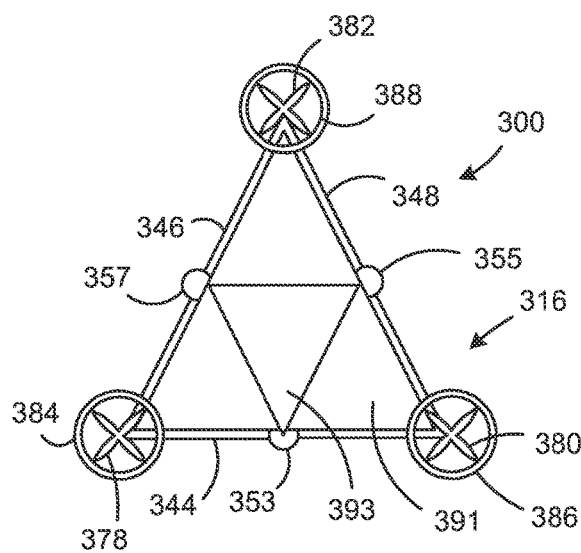
FIG. 10 is a bottom view of the perimeter device illustrated in FIG. 9. The perimeter device is illustrated in a non-deployed configuration.
Figure 11:
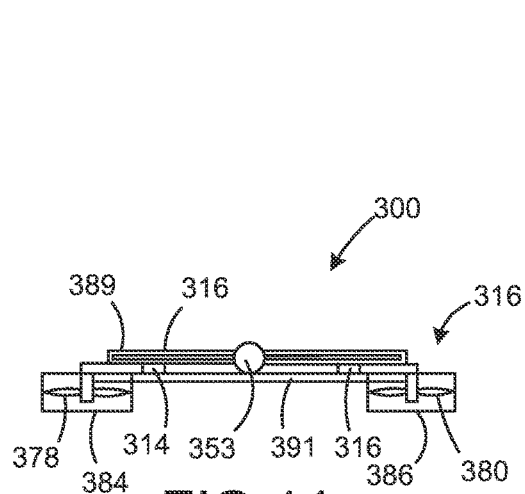
FIG. 11 is a side view of the perimeter device illustrated in FIG. 9. The perimeter device is illustrated in a non-deployed configuration.
Figure 12:
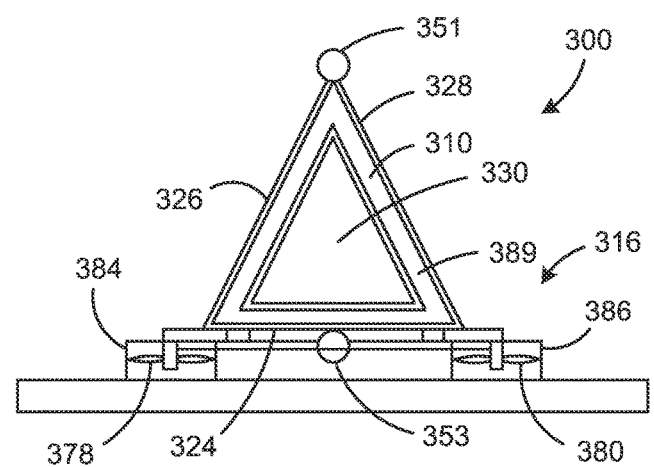
FIG. 12 is a side view of the perimeter device illustrated in FIG. 9. The perimeter device is illustrated in a deployed configuration.

The following detailed description and the appended drawings describe and illustrate various example vehicle perimeters and related devices systems, and method. The description and illustration of these examples enable one skilled in the art to make and use examples of the inventive devices and systems, and to perform the inventive methods. They do not limit the scope of the claims in any manner.

As used herein, the term "associated with," and related grammatical terms, refers to one object being permanently or non-permanently in a structural contact interface with another object. For example, a first object is associated with a second object when the first object is positioned on the second object such that surfaces of each object contact each other. Also, the first object is associated with the second object when the first object is releasably connected to the second object, such as by a mechanical connection, a direct magnetic connection, or other physical connection between the two objects.

As used herein, the term "autonomous," in relation to vehicles, refers to an ability of a vehicle to drive itself. The term is not absolute as vehicles can have varying levels of autonomy. The Society of Automotive Engineers (SAE) defines 6 levels of driving automation ranging from 0 (fully manual; requiring full human control of the vehicle for driving) to 5 (fully autonomous; requiring no human control for driving). These levels have been adopted by the U.S. Department of Transportation. As used herein, the term "fully autonomous," and related grammatical terms, refers to a vehicle at level 5 on the SAE scale (full driving automation). As used herein, the term "partially autonomous," and grammatically related terms, refer to a vehicle at one of levels 1 (driver assistance) to level 4 (high driving automation). on the SAE scale. As used herein, the term "manual controlled," "human driven," "human controlled," and grammatically related terms refer to a vehicle at level 0 (no driving automation) on the SAE scale. The inventions described herein are considered particularly critical for autonomous vehicles, and advantageous for partially autonomous vehicles and human controlled vehicles.

As used herein, the term "base member" refers to a structural member adapted to provide support to another component or components associated with the base member.

As used herein, the term "signal member" refers to a structural member adapted to provide a signal to a human observing the signal member. For example, a signal member can include a reflective surface, light reflective tape, a powered light or lights, a sound-emitting component, or other. Signal members can have any suitable size, shape, and structural configuration, including a triangular configuration, which is conventional and required by many laws and regulations applicable to vehicle perimeters.

As used herein, the term "unmanned aerial vehicle" refers to an aircraft that does not require a human pilot on board to operate the aircraft. An unmanned aerial vehicle is a component of an unmanned aircraft system; which includes a UAV, a controller, which can be ground-based, and a communication system that operably connects the UAV and the controller. The terms "unmanned aerial vehicle," "UAV," and "drone" are used interchangeably herein and all refer to an unmanned aerial vehicle.

As used herein, the term "vehicle" and grammatically related terms refers to a machine used for transporting people or cargo. The term does not require any specific type or category of vehicle, and includes wheeled vehicles, such as cars, trucks, tractors, and railroad engines and cars, for transportation across surfaces, such as roads, paths, tracks, lots, fields, and undeveloped planetary surfaces; marine vehicles, such as boats and ships; and aerial vehicles, such as aircraft.

As used herein, the term "vehicle perimeter" refers to a demarcation of an area adjacent a vehicle created by placement of one or more perimeter devices by the vehicle. Accordingly, an established vehicle perimeter demarcates an area relative to a vehicle. A vehicle perimeter can be continuous or non-continuous, and can comprise any suitable geometric configuration, including a single point defined by a single perimeter device positioned adjacent a vehicle, a line segment defined by two perimeter devices positioned adjacent a vehicle, two or more line segments defined by three or more vehicle perimeter devices positioned adjacent a vehicle, a circle, an oval, a regular polygon, an irregular polygon, or any other suitable geometric configuration defined by a suitable number of perimeter devices positioned adjacent a vehicle. A vehicle perimeter can be static or dynamic, can be deployed in response to a triggering event, and can be deployed from a stationary or moving vehicle.

Example perimeter devices include a signal member, a base member, and a UAV. In some examples, the signal member, base member, and UAV comprise individual structural members connected to in some manner to form the perimeter device. In other examples, a portion of the UAV, such as a frame, provides the base member or the signal member. In these examples, the UAV is connected to the other, non-UAV component (e.g., the base member or signal member not formed by a portion of the UAV). Once deployed and positioned appropriately, inventive perimeter devices can remain in a fixed location relative to a static (e.g., parked) or dynamic (e.g., moving) vehicle for which a perimeter has been established, or the devices can be dynamic relative to the vehicle (e.g., circling the vehicle), adjusting position relative to the vehicle based on role, environment, events, or other parameters.

FIGS. 1, 2, 3, and 4 illustrate an example perimeter device 100. The perimeter device 100 has a non-deployed configuration, illustrated in FIGS. 1, 2, and 3, and a deployed configuration, illustrated in FIG. 4.

The perimeter device 100 includes a signal member 110, a base member 112 movably connected to the signal member 110, a connector 114 disposed on the signal member 110, and a UAV 116 connected to the connector 114 such that the UAV 116 is movable from a first position that is substantially within an opening 130 defined by the signal member 110 to a second position that is substantially external to the opening 130. In the non-deployed configuration, illustrated in FIGS. 1, 2, and 3, the signal member 110 and base member 112 are disposed on parallel planes and the housing 170 of the UAV 116 is disposed within the central opening 130 defined by the signal member 110. In the deployed configuration, illustrated in FIG. 4, the signal member 110 is disposed on a plane that is disposed at a non-parallel angle to a plane within which the base member 112 is disposed. The perimeter device 100 transitions between the non-deployed and deployed configurations through movement of the signal member 110 relative to the base member 112 and movement of the UAV relative to the signal member 110 and the base member 112.

The signal member 110 is a structural member having first 120 and second 122 opposing surfaces, multiple sides 124, 126, 128 that cooperatively define an opening 130. A reflective surface 132 is disposed on the first surface 120 and is adapted to reflect light, such as light directed at the first surface from a vehicle headlight or other light source. In this example, the signal member 110 is a triangular member having first 124, second 126, and third 128 sides. The signal member 110 can comprise a traffic warning triangle, adapted as needed to be incorporated into the inventive perimeter device 100. A second reflective surface can be disposed on the second 122 surface, if desired, to provide reflectivity and visibility from both opposing surfaces 120, 122 of the signal member 110.

The base member 112 is a structural member having a generally complimentary structural configuration to that of the signal member 110, which is considered advantageous at least because it provides for a low profile during aerial movement of the perimeter device 100. Accordingly, in this example, the base member is a structural member having first 140 and second 142 opposing surfaces, multiple sides 144, 146, 148 that cooperatively define an opening 150. In this example, the base member 112 is a triangular member having first 144, second 146, and third 148 sides. In the deployed configuration, the base member 112 provides stability to the deployed perimeter device 100. Accordingly, the base member 112 advantageously has a mass that is greater than the mass of the signal member 110. Also, the base member 112 has a thickness, measured from the first surface 140 to the second surface 142, that is greater than the thickness of the signal member 110, measured from its first surface 120 to its second surface 122.

The base member 112 is movably connected to the signal member 110 such that the signal member 110 is able to rotate about an axis relative to the base member 112 as the perimeter device 100 moves from the first configuration to the second configuration. Accordingly, a connector 160 is attached to both the signal member 110 and the base member 112 and disposed adjacent sides 124, 144 of the signal member 110 and the base member 112 that are disposed adjacent each in both the non-deployed and deployed configurations. Any suitable connector 160 can be used to form the movable connection between the signal member 110 and the base member 112, and a skilled artisan will be able to select a suitable connector for use in a perimeter device according to a particular embodiment based on various considerations, including incremental mass and any desired resistance to movement between the non-deployed and deployed configurations and/or vice-versa. Examples of suitable connectors include hinges, including single hinges that extend along the entire length of the sides 124, 144, single hinges that extend along a portion of the length of the sides 124, 144, and multiple hinges, each of which extend along a portion of the length of the sides 124, 144.

The connector 114 connects the signal member 110 and the UAV 116 such that the UAV is able to move from a first position that is substantially within an opening 130 defined by the signal member 110 to a second position that is substantially external to the opening 130 as the perimeter device 100 moves from the non-deployed configuration to the deployed configuration. Any suitable connector 114 can be used as the connector 114, and a skilled artisan will be able to select a suitable connector for use in a perimeter device according to a particular embodiment based on various considerations, including the materials used in the signal member and UAV of the embodiment, and points of attachment on each of these structures. In this example, the connector 114 is a hinge connected to one side 124 of the signal member and to one propeller shields of the UAV.

The UAV 116 is a multi-propeller drone adapted for remote control operation, including remote control of take-off, flying, maneuvering, and movement necessary to move the perimeter device 100 from the non-deployed configuration to the deployed configuration. The UAV 116 includes a housing 170, multiple support arms 172, 174, 176, multiple propellers 178, 180, 182, and multiple propeller shields 184, 186, 188. Each of the support arms 172, 174, 176 extends from the housing 170 to one of the propellers 178, 180, 182, and each of the propeller shields 184, 186, 188 is disposed around one of the propellers 178, 180, 182. The propeller shields 184, 186, 188 have a diameter sufficient to extend circumferentially around the propellers at their maximum diameter, typically during flight. The UAV 116 includes a power supply, such as a removable and/or rechargeable battery, electronics adapted to control flight operations, and can include memory for storing images and/or video, cameras, such as a still image camera and/or a video camera, sensors, such as proximity sensors, gyroscopic sensors, temperature sensors, other suitable or desirable sensors, and any other suitable or desirable accessories. The UAV 116 need only be suitable for structural securement in and operation of the perimeter device as described herein. In this example, inclusion of at least one propeller shield 184, 186, 188 is considered critical as it provides a desirable point of attachment for the connector 114. Also, the UAV 116 can include a remote control 190 that enables remote operation. Alternatively, the UAV can be adapted for remote control via a computing device adapted to communicate with the UAV via any suitable communication link, including one or more of computer networking connections, WiFi connections, Bluetooth connections, satellite connections, cellular connections, and any other suitable connections capable of transmitting data to and from a remote computing device and the UAV 116. The propellers 178, 180, 182 and the driving motors can comprise any suitable propellers and motors known in the UAV art. It is noted, though, that foldable or collapsible propellers that orient to a flying orientation in response to centripetal force as the motor initiates rotary motion, are considered particularly advantageous at least because these propellers fold to a relatively low-profile configuration when the motor is not powered, reducing the potential for lift to occur by wind or other air movement against the propeller when the perimeter device is in a deployed configuration, which could cause unwanted movement of the perimeter device.

The UAV can include any suitable number and type of sensors, including visual sensors such as cameras, infrared sensors, such as IR cameras, radar sensors, LIDAR sensors, temperature sensors, noise sensors, atmospheric sensors, specific chemical sensors, such as carbon monoxide sensors, and any other sensors for which sensor data is desired. Furthermore, any suitable number of sensors can be included, and a skilled artisan will be able to select an appropriate number of sensors for a perimeter device according to a particular embodiment based on various considerations, including a balance between desired sensor data and weight and overall size of the perimeter device. Perimeter devices according to particular embodiments can include various additional functionalities and/or structural adaptions that make a particular perimeter device suitable for a particular use and/or function. For example, the signal member 110 can include one or more lights, such as an LED panel, adapted to project light from the first surface 120 of the signal member 110 and/or the second surface 122. In these perimeter devices, a power supply, such as a removable and/or rechargeable battery can be included to power the lights. Also in these embodiments, the perimeter device and/or signal device can include a photosensor or other appropriate sensor to determine when lighting is appropriate and activate the light(s) of the signal member when desirable or necessary. Also, one or more solar panels can be associated with the signal member 110 and/or the base member 112 to provide power to the lights, such as through suitable wiring that operably connects the solar panel(s) to the light(s). Also in this embodiment, the connector 114 can be adapted to operate as a switch such that establishes electrical communication between the power supply and/or the solar panel(s) and the light(s) as the perimeter device 100 moves from the non-deployed configuration to the deployed configuration. Also, the UAV can include additional structural elements and functionality to impact its environment in response to appropriate events, such as fire retardant, fertilizer, and spray paint for marking vehicles that enter an established perimeter.

In operation, the perimeter device 100 initiates flight by taking off from a storage location in the non-deployed configuration and flies to a desired deployment location, such as a roadside position adjacent a disabled vehicle. When the perimeter device 100 reaches a location above the desired deployment location, the perimeter device 100 lowers to the ground such that the base member 112 is positioned on the ground at the desired deployment location. The UAV 116 then initiates a movement to rotate the signal member 110 relative to the base member 112 via the connection between these two members, leaving the base member 112 in its position on the ground and the signal member 110 in an angled position relative to the base member 112 such that the signal member 110 is disposed upright relative to the ground at the desired deployment location. Lastly, the UAV 116 initiates a movement to rotate relative to the signal member 110 to place itself on the ground opposite the base member 112 relative to the signal member. At this point, the perimeter device 100 is in the deployed configuration and the base member 112 and UAV 116 are positioned to cooperatively act as a base for the signal member 110, which is disposed at an angle to the ground, extending upwardly from the ground. Thus, during deployment, the UAV 116 effectively flips, having a first surface 192 of the housing 170 upward while the perimeter device 100 is in the non-deployed configuration and having an opposite second surface 194 of the housing 170 upward while the perimeter device 100 is in the deployed configuration. When necessary or desired, these actions can be reversed to transition the perimeter device 100 from the deployed configuration to the non-deployed configuration, which may be desirable when the need for the perimeter device 100 has passed and a return to storage is desired. The perimeter device 100 can be adapted to initiate deployment in response to any suitable signal, including a signal transmitted to the perimeter device by a human operator, which can be an operator of the vehicle or another human that is near the vehicle or distant to the vehicle (i.e., beyond visual line of sight of the vehicle). In particularly advantageous embodiments, though, the perimeter device 100 is adapted to initiate deployment in response to event-based signaling in which a triggering event relating to a status of the vehicle or its environment is transmitted to the perimeter device to initiate its deployment. Examples of suitable triggering events include vehicle immobilizing events, such as vehicle rollover, vehicle impact, vehicle inoperability, vehicle parking, and the like. Further examples of suitable events include image recognition by artificial intelligence and/or machine learning (e.g., recognition of a roadside ditch directly in front of the vehicle, recognition of a rotated horizon relative to the vehicle, etc.), GPS-based events (e.g. the vehicle being in a position sufficiently separated from the location of the edge of a road, positioning or change in positioning of the vehicle relative to a GPS-defined area, i.e., geo-fence related events), environment-based events (e.g., detection of a hazardous material in the environment, detection of rapid temperature elevation in the vehicle environment, etc.), and other suitable events. It is noted that transition of the perimeter device 100 from the deployed configuration to the non-deployed configuration can also be initiated in response to suitable events.

FIGS. 5, 6, 7, and 8 illustrate another example perimeter device 200. The perimeter device 200 has a non-deployed configuration, illustrated in FIGS. 5, 6, and 7, and a deployed configuration, illustrated in FIG. 8.

The perimeter device 200 is similar to the perimeter device 100 described above, except as detailed below. Thus, the perimeter device 200 includes a signal member 210, a base member 212 movably connected to the signal member 210, first 214 and second connectors 215 disposed on the signal member 210, and a UAV 216 connected to the connectors 214, 215 such that the UAV 216 is movable from a first position that is substantially within an opening 230 defined by the signal member 210 to a second position that is substantially external to the opening 230. In the non-deployed configuration, illustrated in FIGS. 5, 6, and 7, the signal member 210 and base member 212 are disposed on parallel planes and the housing 270 of the UAV 216 is disposed entirely within the central opening 230 defined by the signal member 210. In the deployed configuration, illustrated in FIG. 8, the signal member 210 is disposed on a plane that is disposed at a non-parallel angle to a plane within which the base member 212 is disposed. The perimeter device 200 transitions between the non-deployed and deployed configurations through movement of the signal member 210 relative to the base member 212 and movement of the UAV 216 relative to the signal member 210 and the base member 212.

In this example, the UAV 216 is disposed entirely within the opening 230 defined by the sides 224, 226, 228 of the signal member 210. Also, the UAV 216 is connected to the signal member 210 by first 214 and second 215 connectors, each of which comprises a hinge attached to the signal member 210 and one of the propeller shields 284, 286, 288 disposed around the propellers 278, 280, 282 of the UAV 216. This structural arrangement is considered advantageous at least because the positioning of the UAV 216 entirely within the opening 230 of the signal member 210 provides a low profile to the perimeter device 200, which can improve aerodynamics and maneuverability, and because the inclusion of two connectors 214, 215 eliminates a degree of freedom in movement of the UAV 216 relative to the signal member 210 during deployment, which may lead to improved accuracy in final positioning of the perimeter device 200 relative to a desired deployment location.

FIGS. 9, 10, 11, and 12 illustrate another example perimeter device 300. The perimeter device 300 has a non-deployed configuration, illustrated in FIGS. 9, 10, and 11, and a deployed configuration, illustrated in FIG. 12.

The perimeter device 300 is similar to the perimeter device 100 described above, except as detailed below. Thus, the perimeter device 300 includes a signal member 310 and a UAV 316 that includes a frame 312 that provides a base member.

In this example, the signal member 310 is movably connected to the frame 312 of the UAV 316, which functions as the base member. First 314 and second 315 connectors are attached to the signal member 310 and frame 312 to form the connection between the signal member 310 and frame 312. In this example, each of the connectors 314, 315 comprises a hinge. Also in this example, the signal member 310 has multiple sides 324, 326, 328. Similarly, the frame 312 of the UAV has multiple sides 344, 346, 348. In this example, the signal member is a triangle having first 324, second 326, and third 328 sides the cooperatively define an opening 330. Similarly, the base member 312 is a triangular member having first 344, second 346, and third 348 sides.

The UAV 316 has propellers 378, 380, 382 positioned at the vertices formed by the sides 344, 346, 348 of the frame 312. Propeller shields 384, 386, 388 are individually disposed around the propellers 378, 380, 382 of the UAV 316. This configuration is considered advantageous at least because it leverages the structure of the base member as a frame 312 for the UAV 316, effectively eliminating support arms, which ultimately provides a more compact structure. Furthermore, the positioning of the propellers at the vertices formed by the sides 344, 346, 348 of the frame 312 is expected to enhance stability of the perimeter device 300 during flight.

In this embodiment, the signal member 310 includes a light 389, such as a LED. Also, the perimeter device 300 includes a solar panel 391 operably connected to the light or its battery to provide power to the light when the perimeter device is in the deployed configuration. Also, a battery 393 is operably connected to the solar panel 391 and to the UAV 316 to provide power to the UAV 316. A first camera 351 is disposed on a vertice of the warning member 310, and first 353, second 355, and third 357 sensors, which can be cameras or another type of sensor, are mounted on sides of the frame 312 of the UAV 316.

Figure 13:
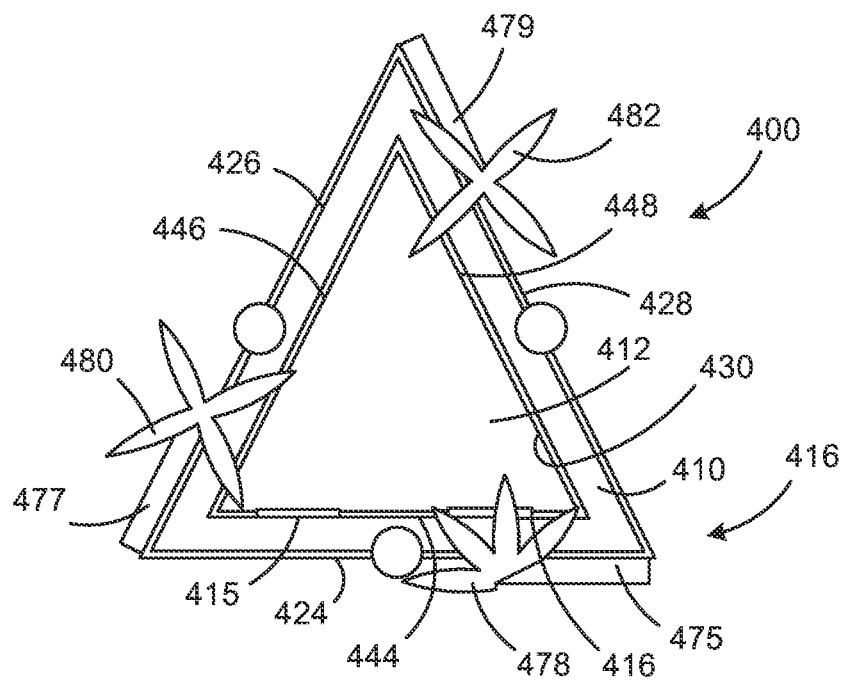
FIG. 13 is a top view of another example perimeter device. The perimeter device is illustrated in a non-deployed configuration.
Figure 14:
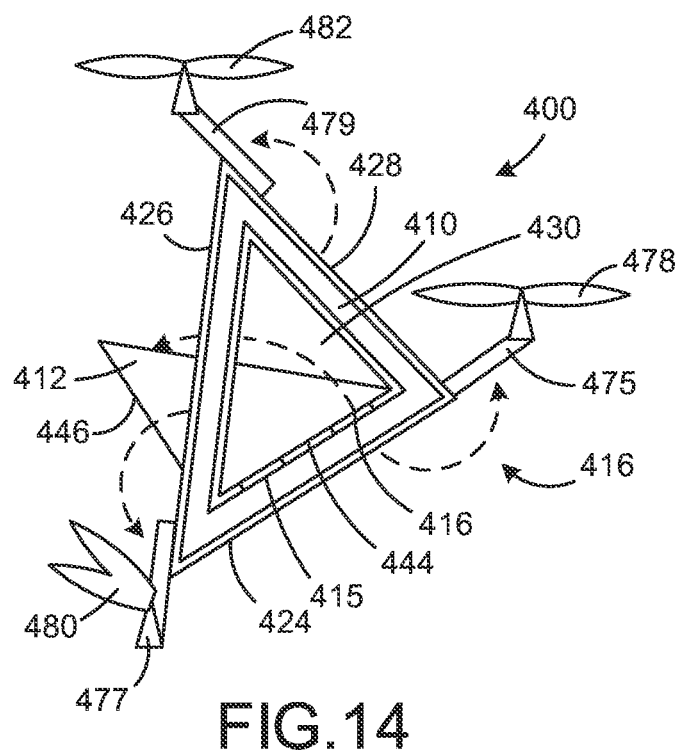
FIG. 14 is a perspective view of the perimeter device illustrated in FIG. 13. The perimeter device is illustrated in a deployed configuration.

FIGS. 13 and 14 illustrate another example perimeter device 400. The perimeter device 400 has a non-deployed configuration, illustrated in FIG. 13, and a deployed configuration, illustrated in FIG. 14.

In this example, the UAV 416 includes a frame 410 that also functions as the signal member of the perimeter device 400. A base member 412 is movably attached to the frame 410 by first 415, 416 connectors. Thus, in this example, the perimeter device 400 includes a base member 410 and a UAV 416 that includes a frame 410 that provides a signal member. The base member 412 is movably connected to the frame 410 of the UAV 416, which functions as the signal member. Each of the connectors 414, 415 comprises a hinge. The frame 410 has multiple sides 424, 426, 428. Similarly, the base member 412 has multiple sides 444, 446, 448. In this example, the frame 410 is a triangle having first 424, second 426, and third 428 sides that cooperatively define an opening 430. Similarly, the base member 412 is a triangular member having first 444, second 446, and third 448 sides. The UAV 416 includes multiple extensions 475, 477, 479, each of which is pivotably attached to one of the sides 424, 426, 428 of the frame 410. A propeller 478, 480, 482 is positioned at the end of each of the extensions. This configuration is considered advantageous at least because it leverages the structure of the signal member as a frame 410 for the UAV 416, effectively eliminating support arms, which ultimately provides a more compact structure. Furthermore, the inclusion of pivotable extensions 475, 477, 479 on the frame 410 is expected to enhance stability of the perimeter device 300 during flight.

Figure 15:
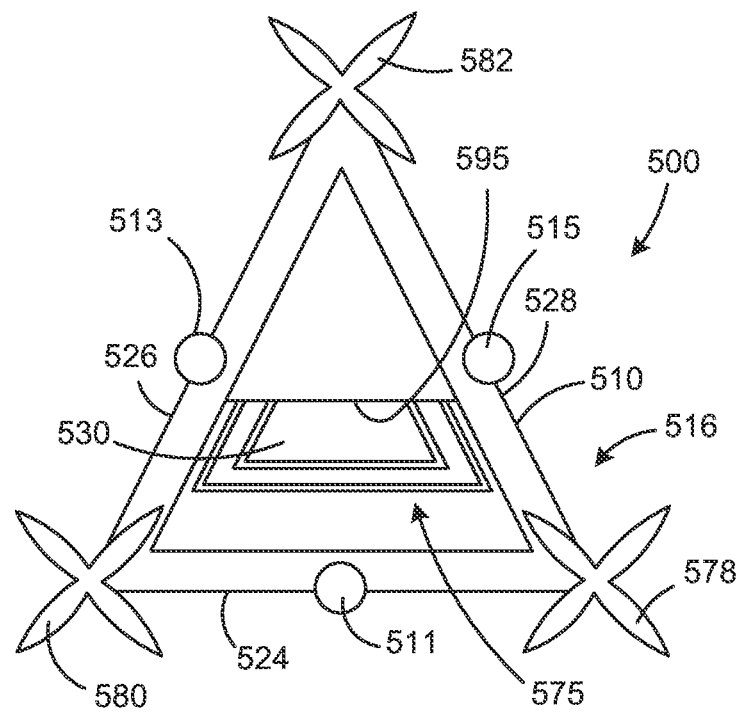
FIG. 15 is a top view of an example UAV. The UAV is illustrated in a non-flying configuration.
Figure 16:
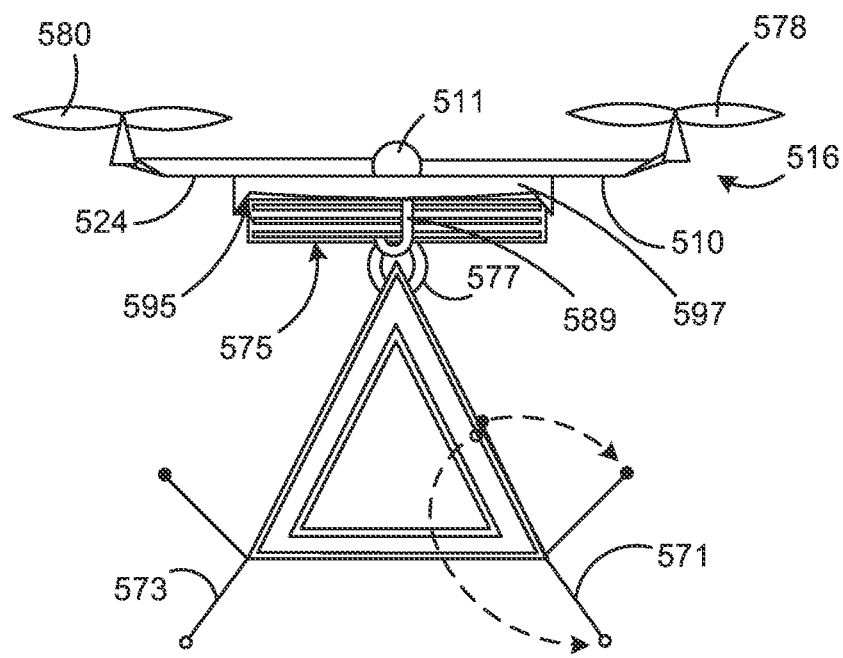
FIG. 16 is a side view of the UAV illustrated in FIG. 15. The UAV is illustrated in a flying configuration.

FIGS. 15 and 16 illustrate another example perimeter device 500. The perimeter device 500 has a storage configuration, illustrated in FIG. 15, and a transport configuration, illustrated in FIG. 16.

In this example, the perimeter device 500 includes a UAV 516 having a triangular frame 510 defined by first 524, second 526, and third 528 sides that cooperatively define an opening 530. The UAV 516 has propellers 578, 580, 582 positioned at the vertices formed by the sides 524, 526, 528 of the frame 510. Multiple cameras 511, 513, 515 are mounted on the frame 510, with one camera 511, 513, 515 attached to each of the individual sides 524, 526, 528 of the frame 510. The UAV 516 includes a storage bay 595 positioned in the opening 530, defined by sides 546, 548 of the frame 510 and covering 597. A hook 589 is attached to the covering 597 and extends downward, away from the propellers 578, 580, 582. A plurality of signal members 575 is positioned in the storage bay 595, arranged as a stack with individual signal members positioned in a plane that is parallel to the plane in which the frame 510 is disposed. Each signal member of the plurality of signal members 575 includes a loop 577 through which the hook 589 extends. Individual signal members of the plurality of signal members 575 are adapted to be released from the hook 589 and storage bay 595 for deployment, as best illustrated in FIG. 16. Individual signal members of the plurality of signal members 575 include support legs 571, 573 that extend outward upon release of the signal member, such as by spring action or other outwardly biased force.

Figure 17:
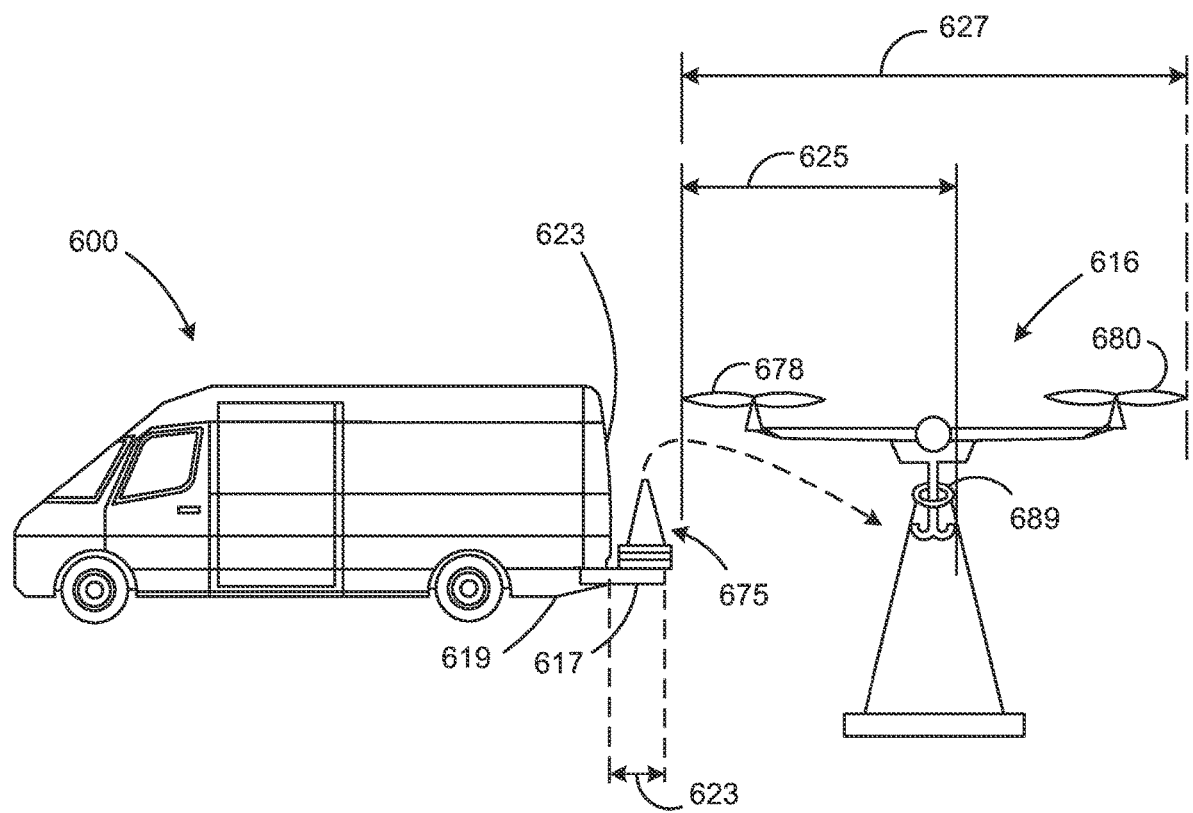
FIG. 17 is a side view of an example vehicle and associated perimeter devices and UAV.

FIG. 17 illustrates an example vehicle 600 with an associated plurality of signal members 675 and a UAV 616. In this example, the vehicle is a commercial delivery van. The plurality of signal members 675 comprises a plurality of individual traffic cones stacked upon each other. The plurality of signal members 675 is disposed on a platform 617 extending from the rear bumper 619 of the vehicle 600. The UAV 616 includes a hook 689 adapted to extend into an opening in a signal member of the plurality of signal members 675, allowing the UAV 616 to transport the signal member away from the vehicle 600. The platform 617 has a depth 621 that extends beyond the rear surface 623 of the vehicle 600 that is greater than a first dimension 625 of the UAV 616 that extends along an axis of the UAV 616 from the outermost surface of the propeller 678 to the furthest surface of the hook 689. This relative dimensioning of the platform 617 is considered critical as it is the minimum dimension that will allow the UAV to successfully retrieve signal members from the plurality of signal members 675. It is considered particularly advantageous that the depth 621 of the platform 617 be greater than the first dimension 625 of the UAV 616. Indeed, it is considered advantageous that the depth 621 of the platform 617 be at least 125% of the first dimension 625 of the UAV 616. It is also considered advantageous that the depth 621 of the platform 617 be at least 150% of the first dimension 625 of the UAV 616. It is also considered advantageous that the depth 621 of the platform 617 be at least the same as a second dimension 627 of the UAV 616 that extends along an axis of the UAV 616 from the outermost surface of the first propeller 678 to the outermost surface of the second propeller 680. It is considered particularly advantageous that the depth 621 of the platform 617 be at least 125% of the second dimension 627 of the UAV 616. It is considered particularly advantageous that the depth 621 of the platform 617 be at least 150% of the second dimension 627 of the UAV 616. It is also considered particularly advantageous that the depth 621 of the platform 617 be at least 200% of the second dimension 627 of the UAV 616.

Figure 18:
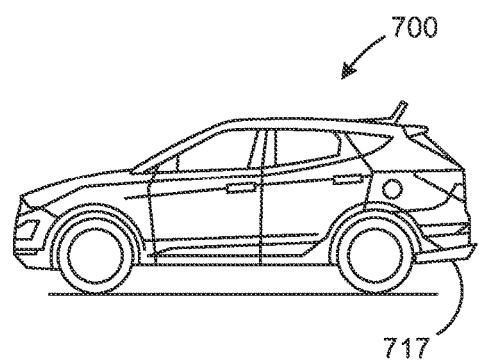
FIG. 18 is a side view of an example vehicle.
Figure 19:
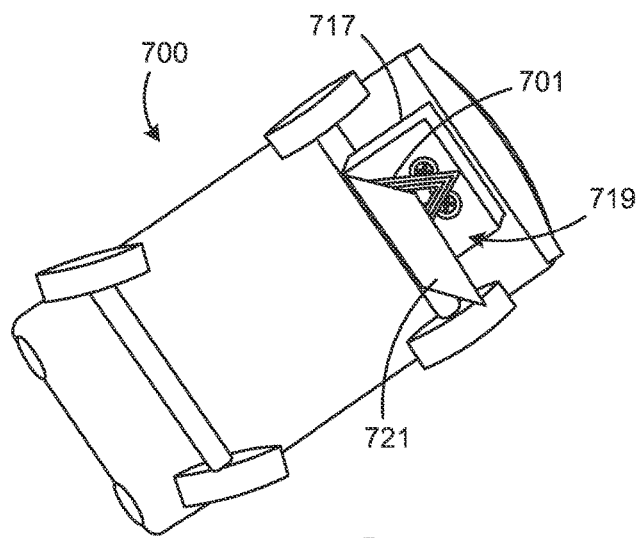
FIG. 19 is a bottom view of the vehicle illustrated in FIG. 18.
Figure 20:
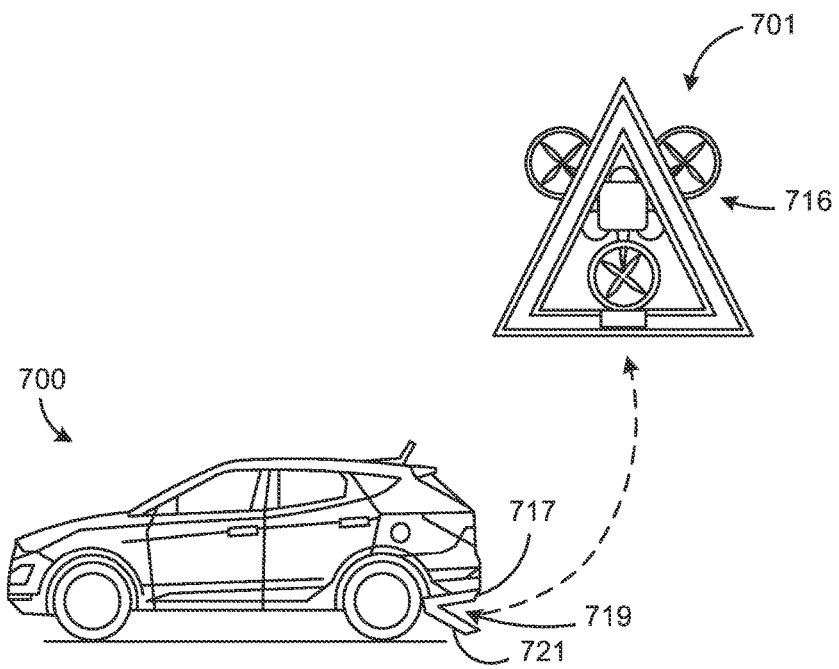
FIG. 20 is a side view of the vehicle illustrated in FIG. 18. The associated perimeter device is illustrated as deployed from the vehicle.
Figure 21:
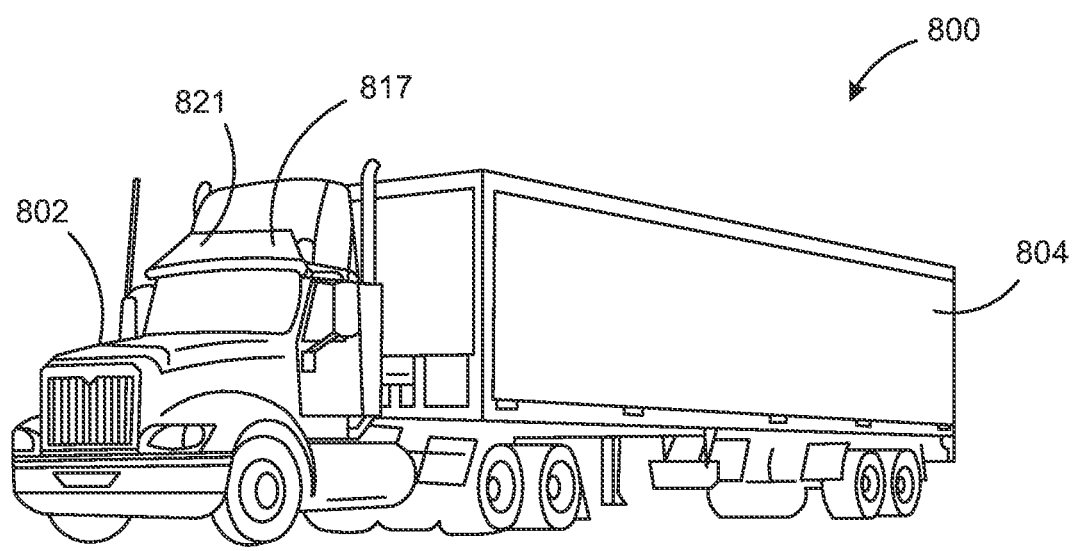
FIG. 21 is a perspective view of another example vehicle.
Figure 22:
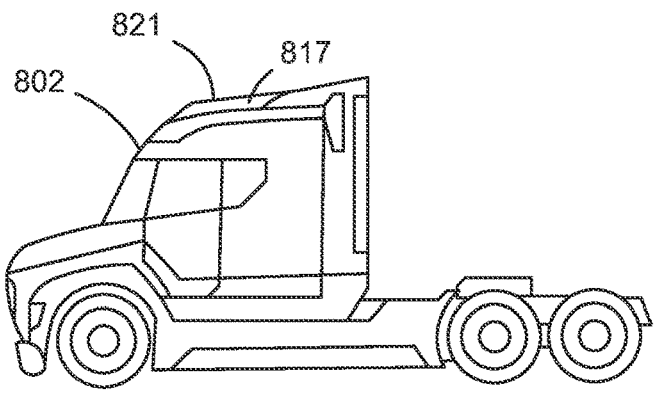
FIG. 22 is a side view of the cab portion of the vehicle illustrated in FIG. 21.

FIGS. 18, 19, and 20 illustrate another example vehicle 700. The vehicle 700 has a perimeter device storage configuration, illustrated in FIG. 18, and a perimeter device deployment configuration, illustrated in FIGS. 19 and 20.

In this example, the vehicle 700 is a passenger automobile, and includes a storage enclosure 717 disposed on the undercarriage of the vehicle 700. The storage enclosure 717 defines a chamber 719 and a movable door 721. A perimeter device 701 according to an embodiment is positioned within the chamber 719 when the vehicle 700 is in the perimeter device storage configuration. The perimeter device 701 is secured to the storage enclosure 717, such as by electromagnets or by a releasable mechanical connection or releasable mechanical connections. As best illustrated in FIG. 19, the movable door 721 can move to open the chamber 719 to the external environment. Once this has been completed, the perimeter device 701 can be released from its connections to the storage enclosure 717 and flown away from the vehicle 700 by its UAV 716 component, allowing the perimeter device 701 to establish a safety perimeter by the vehicle 700. While the illustrated example includes only a single perimeter device 701, multiple perimeter devices can be included in a vehicle according to an embodiment. Indeed, two, more than two, three, a plurality, five, ten, and more perimeter devices can be included in an embodiment. Inclusion of at least three perimeter devices is considered advantageous at least because it represents a balance between space requirements necessary for the storage enclosure 717 and the ability to deploy multiple warning devices in establishing a safety perimeter by the vehicle 700 in accordance with relevant state and federal regulations. The enclosure can include one or more suitable charging units, such as wireless charging pad(s) and/or mechanical connection chargers, for charging the battery of the UAV(s) and/or signal member(s) that are stored in the enclosure.

FIGS. 21, 22, 23, 24, and 25 illustrate another example vehicle 800. The vehicle 800 has a perimeter device storage configuration, illustrated in FIGS. 21 and 22, and a perimeter device deployment configuration, illustrated in FIGS. 23, 24, and 25.

Figure 23:
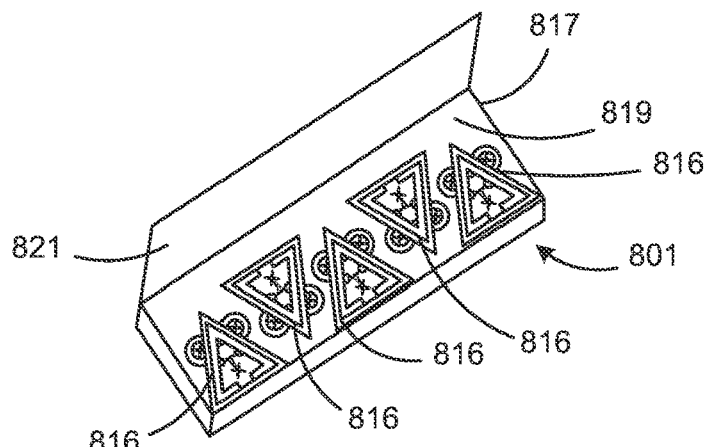
FIG. 23 is a top view of the storage enclosure of the vehicle illustrated in FIG. 21.
Figure 24:
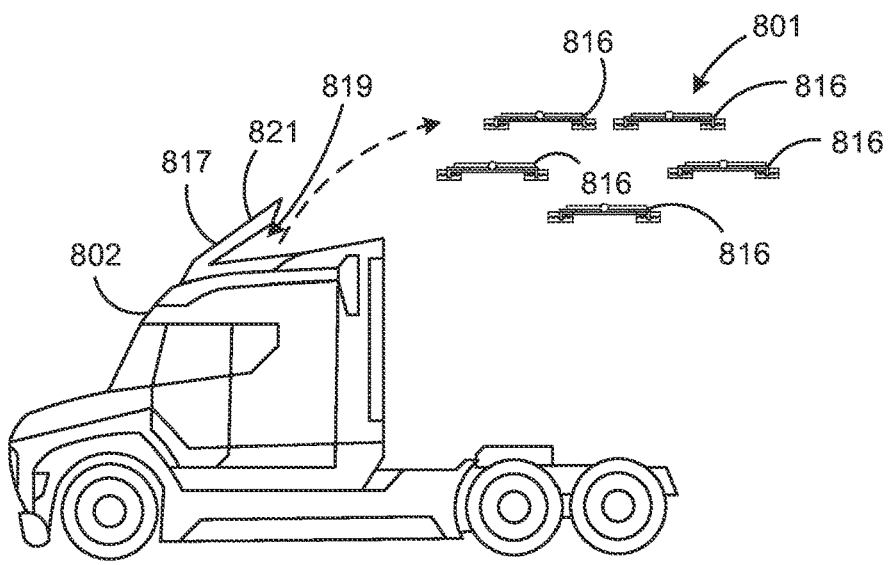
FIG. 24 is a side view of the cab portion of the vehicle illustrated in FIG. 21. The associated perimeter devices are illustrated as deployed from the vehicle.
Figure 25:
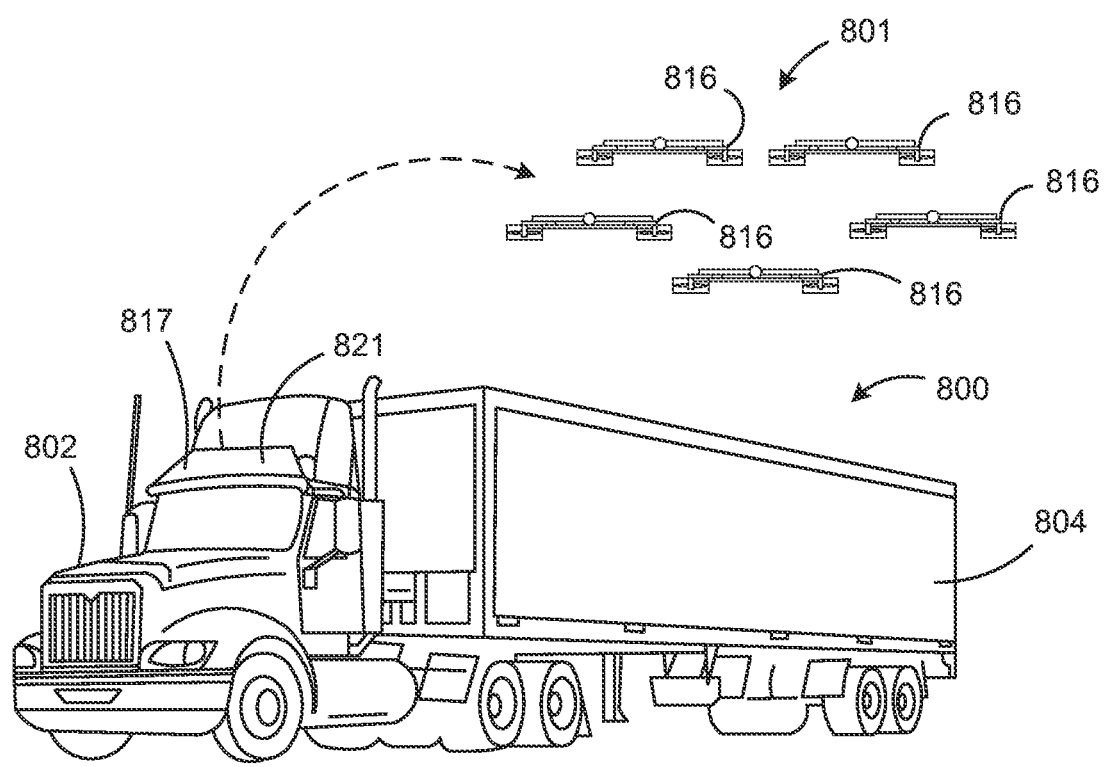
FIG. 25 is a perspective view of the vehicle illustrated in FIG. 21. The associated perimeter devices are illustrated as deployed from the vehicle.

In this example, the vehicle 800 is a semi-trailer truck, and includes a tractor unit 802, sometimes referred to as a "cab" unit, and a trailer 804. The vehicle 800 also includes and includes a storage enclosure 817 disposed on the uppermost surface of the tractor unit 802. As best illustrated in FIG. 23, the storage enclosure 817 defines a chamber 819 and a movable door 821. A plurality of perimeter devices 801 is positioned within the chamber 819 when the vehicle 800 is in the perimeter device storage configuration. Each safety perimeter device of the plurality of perimeter devices 801 is a perimeter device according to an embodiment of the invention. As best illustrated in FIGS. 24 and 25, the movable door 821 can move to open the chamber 819 to the external environment. Once this has been completed, each perimeter device of the plurality of perimeter devices 801 can be flown away from the vehicle 800 by its UAV 816 component, allowing the plurality of perimeter devices 801 to establish a safety perimeter by the vehicle 800.

Figure 26:
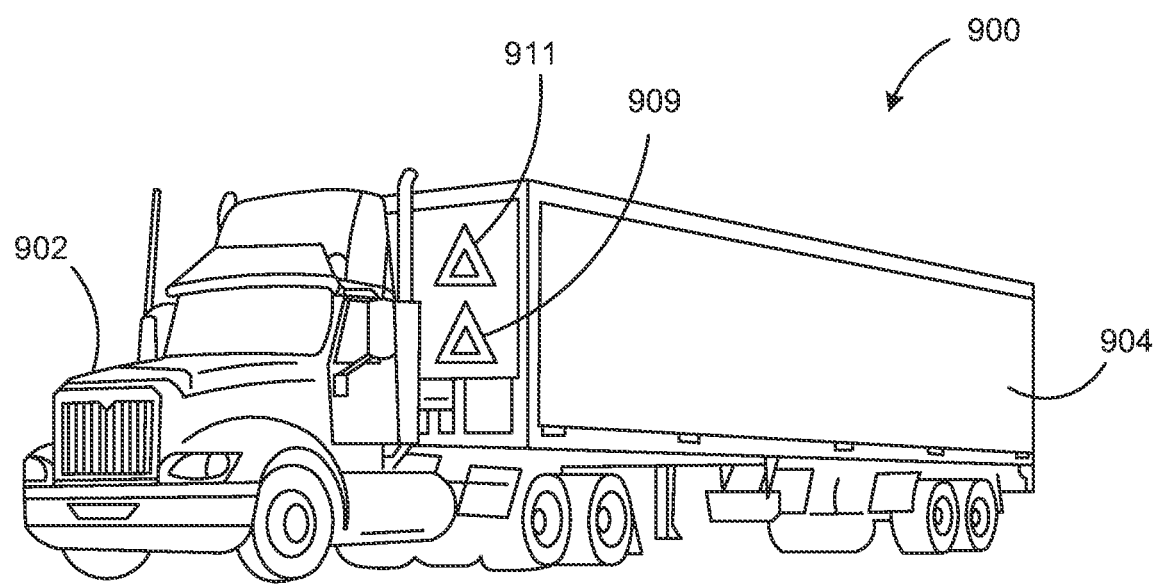
FIG. 26 is a perspective view of another example vehicle.
Figure 27:
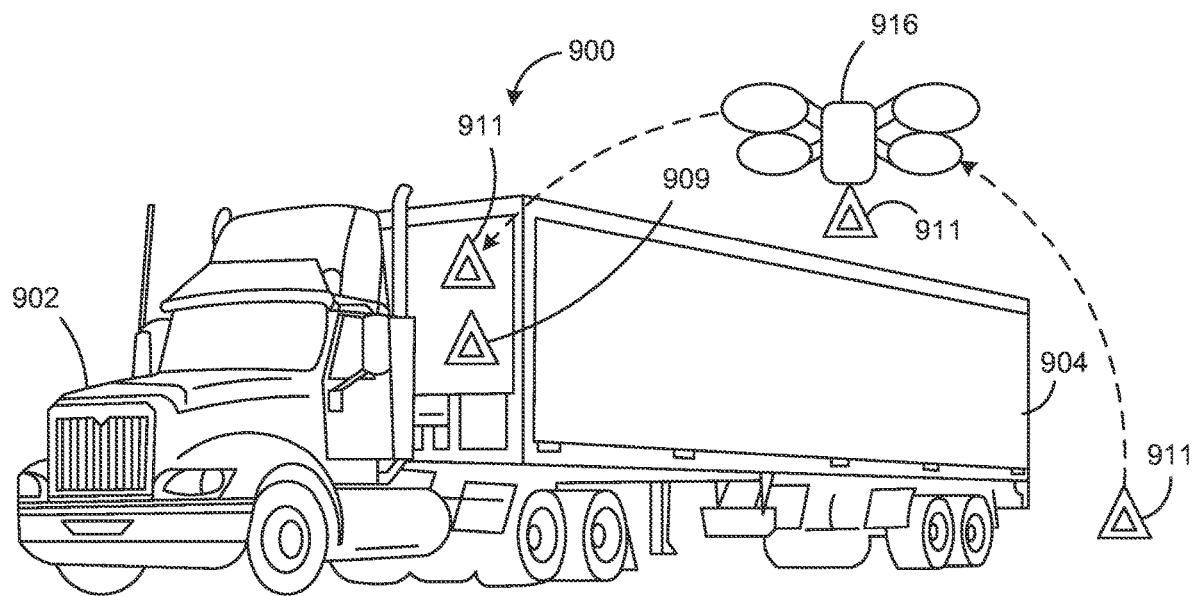
FIG. 27 is a perspective view of the vehicle illustrated in FIG. 26. A UAV associated with the vehicle is transporting a perimeter device associated with the vehicle.
Figure 28:
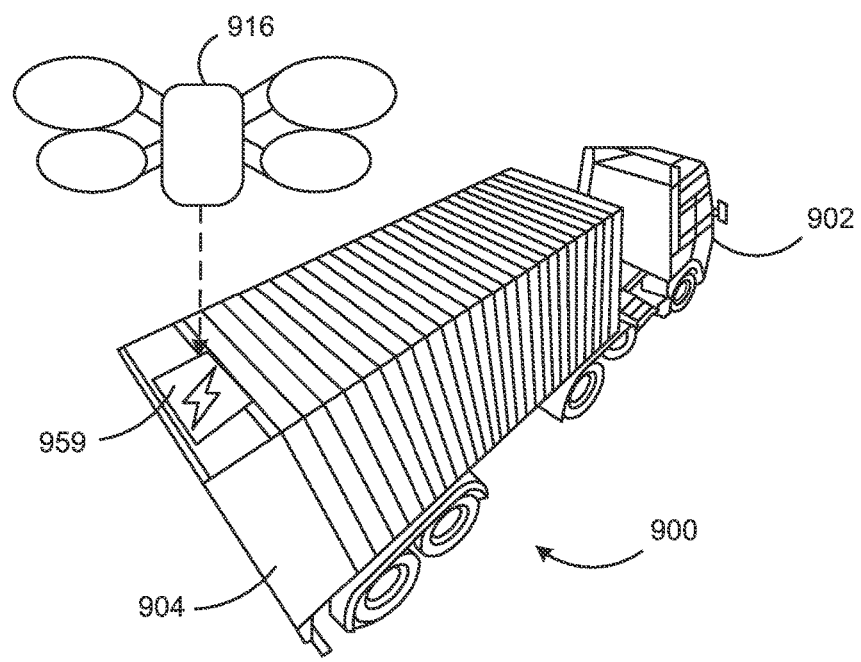
FIG. 28 is a perspective view of the vehicle illustrated in FIG. 26. A UAV associated with the vehicle is approaching a monitoring station positioned on the vehicle.

FIGS. 26, 27, and 28 illustrate another example vehicle 900. The vehicle 900 has a perimeter device storage configuration, illustrated in FIG. 26, and a perimeter device deployment configuration, illustrated in FIGS. 27 and 28.

The vehicle 900 is similar to the vehicle 800 described above, except as detailed below. Thus, the vehicle 900 is a semi-trailer truck, and includes a tractor unit 902 and a trailer 904. The vehicle 900 also includes first 909 and second 911 signal members secured to the trailer 904. A UAV 916 is associated with the vehicle 900 and can be disposed on any suitable portion of the vehicle 900 while the vehicle 900 is in the perimeter device storage configuration. For example, as illustrated in FIG. 28, the vehicle can include a charging pad 959 disposed on the top surface of the trailer 904 or in another suitable location on the vehicle 900. The charging pad 959 can mechanically engage with the UAV 916 to establish electrical contact between a power supply operably connected to the charging pad 959. Alternatively, a wireless charging connection can be established between the charging pad 959 and the UAV to establish electrical charging communication between a power supply operably connected to the charging pad 959 and the UAV 916. When necessary or desired, as best illustrated in FIG. 27, the UAV 916 can leave its position on the vehicle 900 and retrieve one or both of the signal members 909, 911 and position them on a road surface by the vehicle 900 to establish a safety perimeter by the vehicle 900. Once a safety perimeter is established, the UAV 916 can return to the charging pad 959 to recharge and/or to monitor the safety perimeter through attached cameras and/or sensors.

Figure 29:
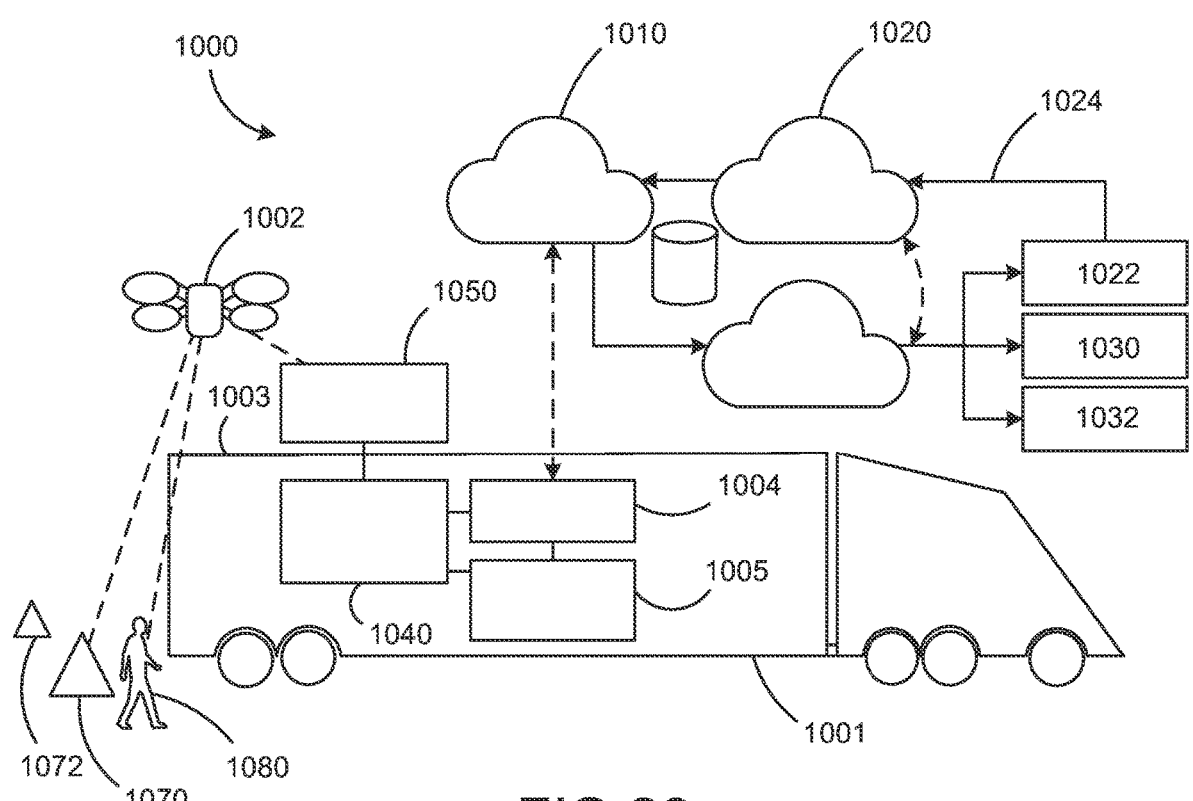
FIG. 29 is a schematic illustration of an example vehicle perimeter system.

FIG. 29 is a schematic illustration of an example vehicle perimeter system 1000. The vehicle perimeter system 1000 comprises a vehicle 1001 and at least one UAV 1002 adapted to be mounted on and deployed from the vehicle 1001. The UAV 1002 can be a UAV according to an embodiment of the invention, such as the example UAVs described herein. The UAV 1002 is deployable from the vehicle 1001 when the vehicle 1001, or a driver or remote operator or monitoring system of the vehicle 1001, transmits a signal to the UAV 1002 indicating that the vehicle is temporarily immobilized or in response to a triggering event to which the UAV is adapted to respond, as described above. The UAV 1002 is configured to survey the environment immediately surrounding the vehicle 1001 and determine optimal positioning for one or more perimeter devices near the vehicle during its period of immobilization. In some embodiments, the UAV 1002 is configured to fly to the determined position, or one of the determined positions, and to release a perimeter device carried by the UAV 1002, such as a cone, reflective triangle, flashing light, or the like, at the determined position. In these embodiments, the UAV 1002 can retrieve the perimeter device (s) when the need for the device(s) is removed, as the UAV 1002 returns to the designated mounting area. In other embodiments, the UAV 1002 is a component of a perimeter device, such as the examples described herein and illustrated herein, allowing the UAV 1002 to move itself to a determined position and subsequently serve as a perimeter device itself. In these embodiments, the UAV 1002 is configured to fly to the determined position, or one of the determined positions, and to adopt its perimeter device configuration, and then place itself at the determined position. The UAV 1002 is configured to leave the determined position, and leave its perimeter device configuration if appropriate, when the vehicle 1001, or a driver or remote operator of the vehicle 1001, transmits a signal to the UAV 1002 indicating that the vehicle 1001 is no longer temporarily immobilized. Once this signal is received, the UAV 1002 leaves the determined position and flies to the vehicle 1001, ultimately mounting itself on the designated mounting area on the vehicle 1001.

The vehicle 1001 can comprise any suitable vehicle, including a passenger car, a delivery vehicle, and a cargo vehicle. Examples of suitable vehicles include two person cars, four person cars, pickup trucks, minivans, standard vans, contractor vans, dump trucks, box trucks, package delivery trucks, tanker trucks, and semi-trucks. Non-road vehicles can also be used, including agriculture vehicles such as tractors and combines, trains, such as passenger trains and freight trains, planes, boats, and other vehicles. Furthermore, the vehicle can comprise a human-driven vehicle, a partially autonomous vehicle, such as a human-driven vehicle with autonomous functionality that can be activated by a human operator of the vehicle, or a fully autonomous vehicle, such as a vehicle that does not require a human operator to be present in the vehicle during its operation.

The vehicle 1001 has a designated mounting area 1003 on or in which at least one UAV 1002 is adapted to be mounted. The designated mounting area 1003 can be a portion of a surface of the vehicle, such as a rooftop, exterior sidewall, interior ceiling, interior sidewall, under the vehicle, on a trailer or other component associated with the vehicle, an attached enclosure, or the like. The designated mounting area 1003 can comprise a flat surface on which the UAV(s) are mounted, or can comprise a chamber within which the UAV(s) are disposed or partially disposed. For example, a low profile storage chamber within which the UAV(s) can be disposed can be placed on top of the vehicle, such as a semi-truck. The designated mounting area can include charging functionality for the UAV(s), such as battery charging. Also, the designated mounting area can include mechanical mounting features that facilitate retention of the UAV(s) on the designated mounting area, such as latches, straps, magnetic pads, etc. The vehicle 1001 can include various optional components, including a communications link 1004 for communicating with additional computing resources that are included in the system, as described below. The communications link 1004 can be integrated with an on-board trailer management platform software program 1005.

In some embodiments, multiple UAVs are mounted on the vehicle. In these embodiments, one UAV can be designated as the survey UAV. Upon receiving a signal that the vehicle is temporarily immobilized, the survey UAV surveys the seen to determine an optimal number of perimeter devices to secure the scene and the optimal positioning for the one or more perimeter devices to achieve the determined number. Once the survey UAV completes the survey, it transmits one or more signals to other UAVs mounted to the vehicle, instructing each UAV to on a determined position. Each of the UAVs then flies to its respective determined position and either releases a perimeter device it is carrying, such as a cone, reflective triangle, or the like, at the determined position, or adopts its perimeter device configuration and places itself in that configuration at the position.

In these embodiments, the survey conducted by the survey UAV can include an assessment of the landscape around the vehicle, any traffic near the vehicle, pedestrians near the vehicle, weather, local or other laws, such as laws relating to vehicle perimeter requirements, and other sources. The survey UAV factors information from one, more than one, multiple, or all of these sources when determining the optimum number and position(s) for the safety perimeter UAV(s).

In some embodiments, the survey is conducted remotely from the vehicle and UAV(s), such as by computer servers or other computer resources that are adapted to communicate with the UAV(s) via computer network communications, such as over the internet. For example, one or more cloud-based servers 1010 can receive information and/or content from one or more of the UAVs 1002 relating to the scene at which the vehicle 1001 is temporarily disabled, including geolocation coordinates, photographs, video, sound, and other information and/or content. The cloud-based servers 1010 or other remote computing resources can factor this information and/or media into a survey determination, and then transmit information relating an optimum number and positions for perimeter devices to a designated survey UAV 1002 or to individual UAVs, as described above. In addition to, or as an alternative to, position-related information, other information can be transmitted back to the designated survey UAV 1002, such as next actions, event-related information (e.g., aircraft entering air space above the vehicle, official declaration of a no-fly zone that includes the vehicle, etc.). Remote computer resources in all embodiments can include computing resources connected by satellite network(s), computing network(s), local network(s), personal network(s), or vehicle network(s). Also, remote computer resources can include computing resources that are components of a remote trailer management platform. Also, cloud computing resources can include an application programming interface layer, a serverless computing layer, such as Lambda from Amazon Web Services, messaging layers, and other computing layers typically associated with cloud-based computing platforms.

In some embodiments, the survey UAV and/or the remote computing resources use one or more artificial intelligence 1020 and/or machine learning algorithms 1022 in the determination of optimum number and/or position of perimeter devices. Human in the loop training 1024, can be implemented to improve the AI/ML components, such as Amazon Mechanical Turk projects. Various support operational computing resources 1030, 1032 can also be integrated into the system 1000, such as customer support communications, remote video monitoring, and the like. Also in some embodiments, the survey UAV and/or the remote computing resources use machine vision and/or sensors in the determination of optimum number and/or position of perimeter devices. Additional system components can include various accessories 1040, such as a storage enclosure, one or more charging devices, associated controllers, batteries, and the like, and a software development kit 1050 operably associated with the UAV 1002. One or more perimeter devices 1070, 1072 are also associated with the vehicle 1001. The vehicle 1001 can be a fully autonomous vehicle, or a human controlled vehicle controlled by vehicle operator 1080.

Thus, some embodiments are assisted by a human operator, which can be a driver or human serving another operational role for the vehicle 1001, such as to initiate scene survey, etc., while others are fully autonomous in which the vehicle 1001 detects its temporary immobilization or other condition for which a perimeter is desired and sends one or more instruction signals to the associated UAV(s) based on the occurrence of one or more triggering events, such as those described above. Also, in some embodiments, the computing effort to survey the scene is done completely locally, such as by a designated survey drone. In other embodiments, the computing effort is completely centralized, such as in a dedicated server or servers located in a cloud computing environment that are in configured to communicate with the UAV(s). In still other embodiments, the computing effort is shared, with some of the effort completed by one or more UAVs as edge devices and some of the effort completed by a dedicated server or servers located in a cloud computing environment that are in configured to communicate with the UAV(s).

In some embodiments, one or more of the UAV(s) continually monitor the environment immediately around the vehicle to determine, either locally or by or with assistance of remote computing resources, if a situational change has occurred that warrants deployment of a safety perimeter. In these embodiments, the UAV(s) can use various inputs to continuously monitor the environment around the vehicle, such as audio input, time interval photographs, video, etc. For example, the UAV(s) can conduct surveillance of the perimeter of the scene, monitor for warning devices, and vehicles and/or people approaching or moving into or out of the perimeter. In some embodiments, the UAV(s) are configured to issue to vehicles and/or people approaching or moving into or out of the perimeter, such as an audible warning, a visual warning, or both.

In some embodiments, the UAV(s) are configured to autonomously avoid fixed and moving obstacles while performing various functions described herein, such as trees, overpasses, oncoming vehicles, and people.

Embodiments of the invention can be used to satisfy requirements issued by the Department of Transportation, including requirements for Stopped Commercial Motor Vehicles—Emergency signals, stopper commercial motor vehicles. For example, embodiments of the invention can be used to satisfy US Government CFR Title 49: Transportation, Subpart C—Stopped Commercial Motor Vehicles, § 392.22 Emergency signals; stopped commercial motor vehicles.

The systems, methods, and devices described herein can be used to provide warning systems and also to designate and/or demarcate other types of areas, too, such as hazardous areas, zones, lanes, and fields.

In some embodiments, the one or more of the UAV(s) are configured to detect a rollover in progress by the vehicle and/or pre-rollover indicators and initiate deployment in response to these detection activities. This would allow the UAV(s) to deploy before any accident associated with the rollover or anticipated rollover is over, which could avoid destruction of the UAV(s) and/or interruption and/or destruction of reporting by the UAV(s). This also allows the UAV(s) to survey and report the accident scene and report geo location to service providers.

In some embodiments, the UAV(s) are configured to generate and submit automated permission requests, such as flight plans, emergency flight zones/areas compliant with FAA 107, an/or requests for institution of a temporary no-flight zone.

In some embodiments, the UAV(s) are configured to issue perimeter violation or change warnings to on site entities, such as people, cars, etc., near a site, and/or to remote services, such as local police or emergency services, when a person or object violates an established safety perimeter, and/or when an established safety perimeter changes. A perimeter violation or change warning can be an audible signal, such as a siren pre-recorded message, or computer-generated message, a visual signal, such as a flashing light, a data signal, or any combination of these.

In some embodiments, the designated mounting area is configured to recharge batteries in the UAV(s) and/or the signal members. Also, the designated mounting area can include spare batteries for the UAV(s) and/or the signal members with their own chargers. The UAV(s) can be adapted to engage spare batteries when needed, which can include removing spent or partially spent batteries. In these embodiments, the UAV(s) are configured to self-swap batteries, and the designated mounting area is configured to support this functionality.

The designated mounting area can include suitable structure for charging and/or recharging any associated batteries, such as solar panels, wind turbine, connections to on-vehicle electrical system(s), and trailer power sources. These charging and/or recharging structures can be redundant over primary charging and/or recharging systems for the UAV(s) and advantageously are configurable.

In some embodiments, the designated mounting area is adapted to support battery charging for both the UAV(s) and the perimeter devices.

In some embodiments, the perimeter safety devices are adapted to self-swap batteries when needed. Also, in some embodiments, the UAV(s) are adapted to swap batteries out of the perimeter safety devices when needed.

In some embodiments, the perimeter safety devices are adapted to self-charge or redundant charge via solar panel(s) and/or mini-wind turbine(s) located on the vehicle. For example, the vehicle can include one or more mini wind turbines adapted to charge the batteries of the perimeter safety devices and/or the UAV(s) using the wind exposed to the mini wind turbines while the vehicle is at rest and/or while the vehicle is in motion.

Figure 30:
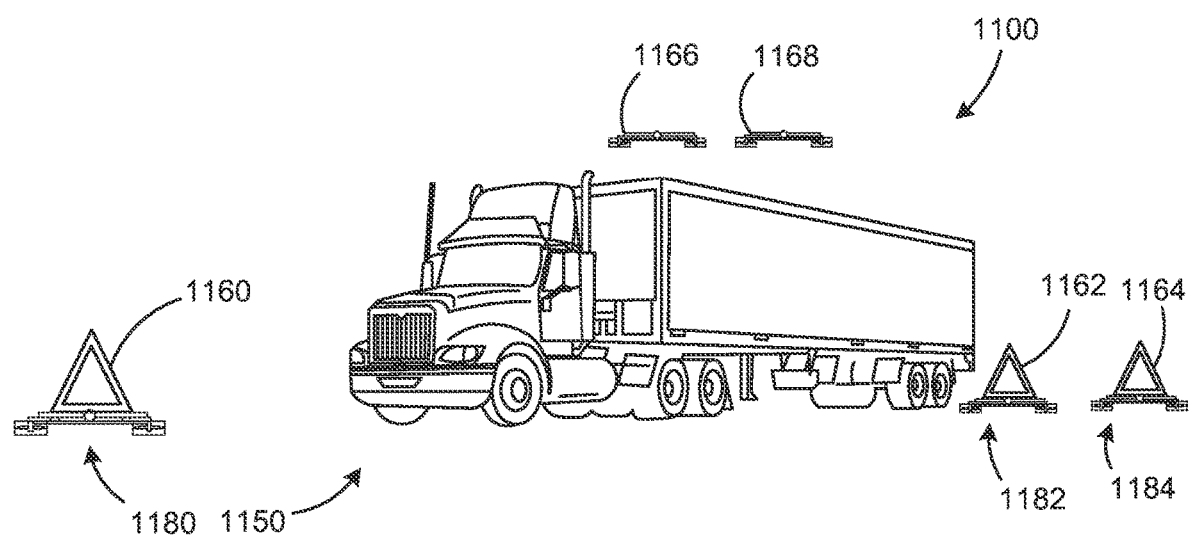
FIG. 30 is a perspective view of an example vehicle and deployed vehicle safety perimeter.

FIGS. 30, 31, and 32 illustrate an example vehicle 1100 and a deployed vehicle perimeter 1150. First 1160, second 1162, and third 1164 perimeter devices have been deployed from the vehicle 1100 and positioned at first 1180, second 1182, and third 1184 determined locations by the vehicle 1100. Each of the first 1160, second 1162, and third 1164 perimeter devices comprise a perimeter device according to an embodiment in which the perimeter device includes a UAV component. First 1166 and second 1168 UAVs, which may include perimeter devices, are positioned above the vehicle 1100 and monitoring the safety perimeter 1150.

As best illustrated in FIG. 31, a UAV 1166 designated for monitoring the safety perimeter 1150 can monitor for penetration of the safety perimeter by humans 1170 or other animals. If a human 1170 enters a pre-defined area surrounding the safety perimeter 1150, the UAV 1166 can transmit a visible and/or audible signal to the human 1170 to notify them of the presence of the safety perimeter 1150 their intrusion into the pre-defined area.

As best illustrated in FIG. 32, a UAV 1168 designated for monitoring the safety perimeter 1150 can survey the safety perimeter 1150 after its deployment, flying along the length of the safety perimeter 1150 and vehicle 1100 and measuring distances between the vehicle 1100 and the perimeter devices 1160, 1162, 1164 and verifying compliance with applicable rules, regulations, and/or laws. Furthermore, the UAV 1168 can adjust the position one or more of the perimeter devices 1160, 1162, 1164 if any measurements indicate non-compliance with applicable rules, regulations, and/or laws. Furthermore, the UAV 1168 can record and store still and video images of the safety perimeter 1150 for later retrieval and/or viewing by others to verify compliance with applicable rules, regulations, and/or laws. Monitoring performed by UAV 1168 can include use of one or more appropriate sensors on the UAV 1168, including cameras and other sensors, and can include collection of images and/or other data for forensics (e.g. scene reconstruction), verification of visibility of the perimeter, monitoring to disturbance of perimeter, and jurisdictional compliance, such as compliance with local rules and regulations for perimeters, UAV operation, environmental rules and regulations, and the like.

Figure 33:
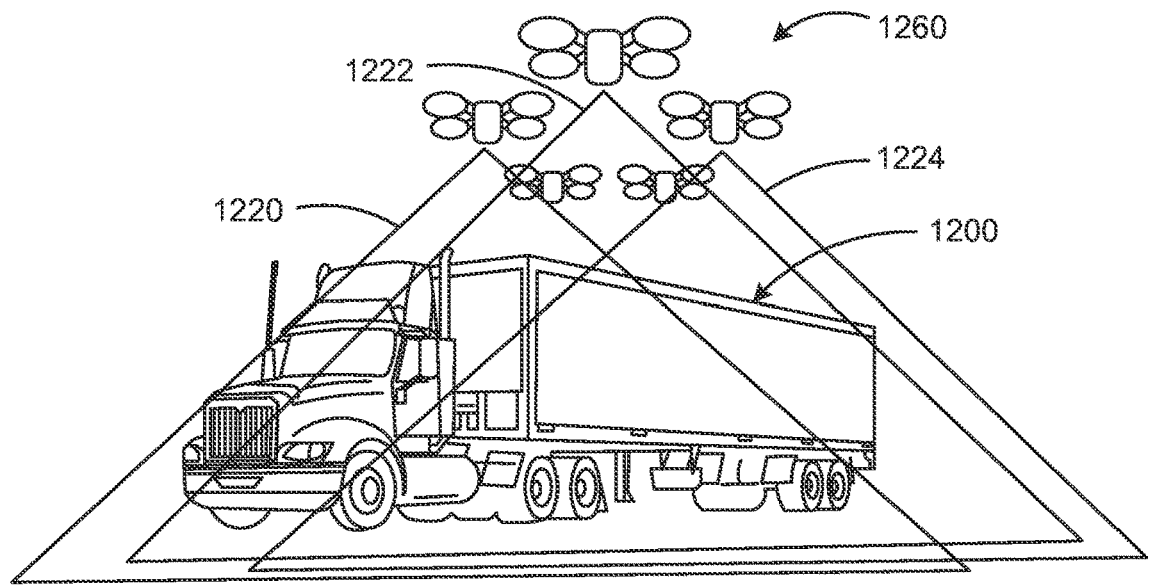
FIG. 33 is a perspective view of another example vehicle and components of a vehicle perimeter during deployment.
Figure 34:
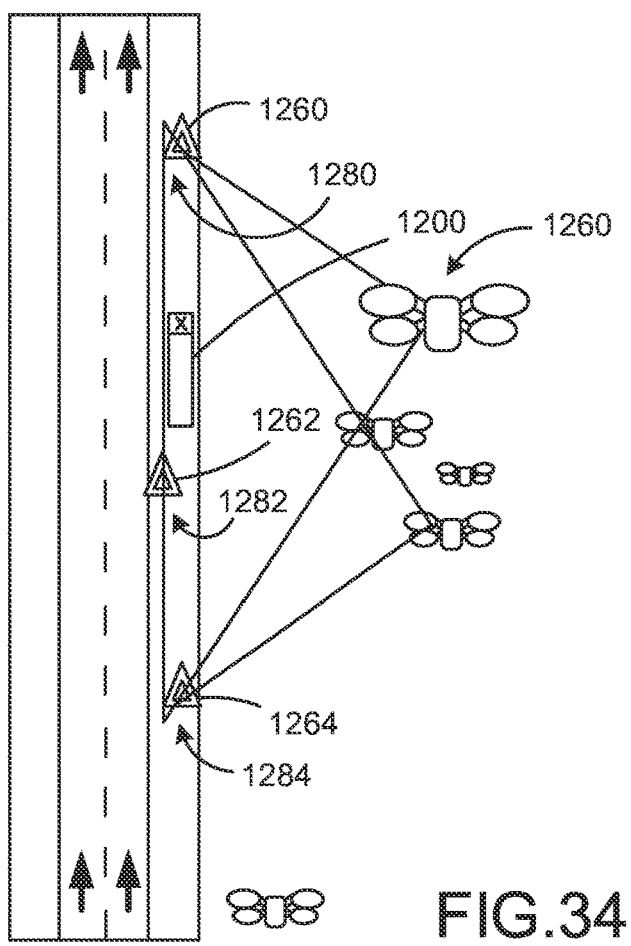
FIG. 34 is a top view of the vehicle illustrated in FIG. 33 following deployment of the vehicle safety perimeter.

FIGS. 33 and 34 illustrate another example vehicle 1200 a plurality of UAVs 1260 positioned above the vehicle 1200. In FIG. 33, the plurality of UAVs 1260 is inspecting the scene surrounding the vehicle prior to deployment of a perimeter using cameras and/or sensors (as signified by inspection zones 1220, 1222, 1224). In this example, the UAVs record images, video, and/or sensor data relating to the situation presented in the scene, such as weather conditions, traffic conditions, visibility levels, topographic information, and the like. Once sufficient data is acquired, the UAVs, acting individually or collectively, process the data, either locally or via connection to remote computing resources, to develop a perimeter device deployment plan, which includes recommended deployment locations for individual perimeter devices. Once the perimeter device deployment plan is developed, the UAVs can deploy themselves into individual deployment locations or initiate deployment of additional UAVs according to embodiments described herein, either as perimeter devices themselves or to retrieve and position perimeter devices associated with the vehicle 1200. Following deployment, as best illustrated in FIG. 34, the perimeter 1250 is established. First 1260, second 1262, and third 1264 perimeter devices have been deployed from the vehicle 1200 and positioned at first 1280, second 1282, and third 1284 determined locations by the vehicle 1200. Each of the first 1260, second 1262, and third 1264 perimeter devices comprise a perimeter device according to an embodiment in which the perimeter device includes a UAV component.

As noted above, vehicle perimeters established using the inventive devices, systems, and methods are defined relative to the position of a vehicle for which the perimeter is demarcating an area adjacent the vehicle. The vehicle can be stationary or moving. Similarly, the perimeter can be stationary or moving. In examples in which the vehicle is stationary, such as an immobilized vehicle, the perimeter is also stationary once deployed, although adjustments to positions of perimeter device(s) and/or the overall relative location and/or size of the perimeter can be made as needed. In examples in which the vehicle is moving, the perimeter is dynamic and moves along with the vehicle to maintain the established perimeter. In examples where the perimeter is moving, the perimeter devices may dynamically vary their location or height or mode of operation to maximize the effectiveness of the perimeter for applications like security, data collection, and/or environment control.

Figure 35:
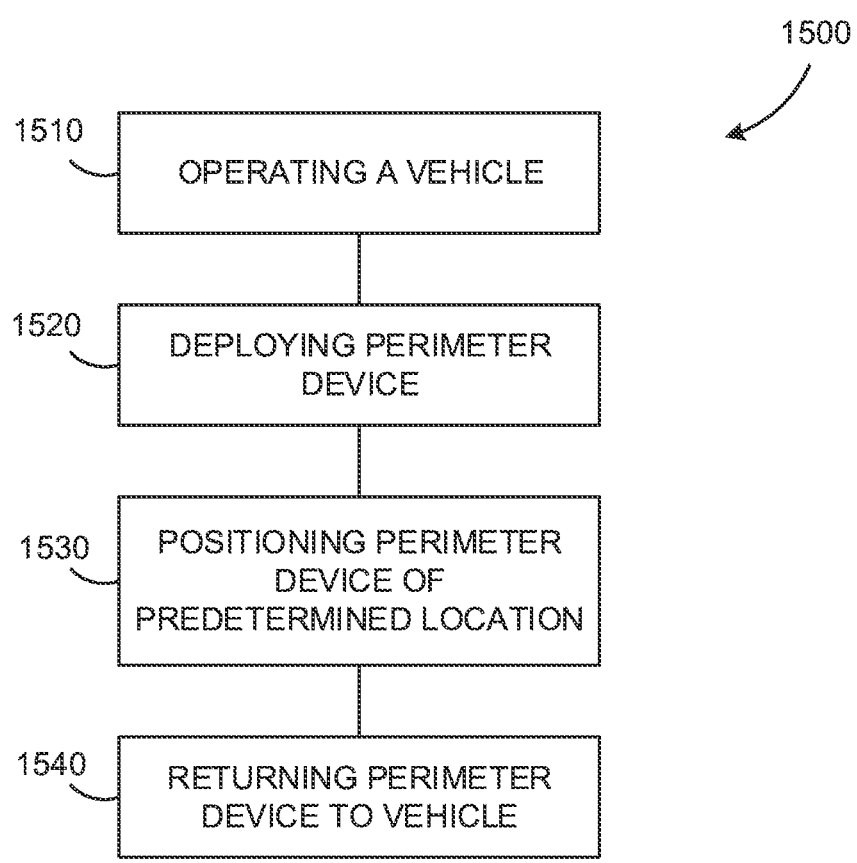
FIG. 35 is a flowchart illustration of an example method of establishing a vehicle safety perimeter.

FIG. 35 is a flowchart representation of an example method 1500 of establishing a vehicle safety perimeter. A first step 1510 comprises operating a vehicle having at least one perimeter device associated with the vehicle according to an embodiment of the invention, such as one of the example perimeter devices described and illustrated herein. A second step 1520 comprises deploying the perimeter device from the vehicle by operating the UAV component of the perimeter device. A third step 1530 comprises positioning the perimeter device at a predetermined location relative to the vehicle to establish the safety perimeter. An optional step 1540 comprises returning the perimeter device to the vehicle such that the perimeter device is again associated with the vehicle.

In this method, and all methods, the predetermined location can comprise a location defined by a specific distance and angle from a particular portion of the vehicle (e.g., 100 ft. from the left corner of the front bumper of the vehicle), a location defined by specific GPS coordinates, or other suitable location-defining information. Also, the predetermined location can be determined prior to operating the vehicle 1510 and, indeed, prior to initiation of the method. For example, a distance and angle position relative to the vehicle can be predefined and stored in a perimeter device prior to association of the perimeter device with the vehicle. Alternatively, the predetermined location can be determined after operating the vehicle 1510 and prior to deploying the perimeter device 1520. For example, in the event of a vehicle incapacitating event, such as an accident or mechanical and/or electrical failure, the perimeter device or a remote computing resource, such as cloud connected servers or other components, can determine an appropriate predetermined position based solely on physical attributes of the vehicle (e.g., rollover status, presence of a jack-knife, etc.), solely on situational attributes (e.g., weather, visibility, traffic levels, etc.), or a combination of both of these approaches. Event triggers can be transmitted to remote computing resources for decision-making, with instructions transmitted back to the local perimeter devices for implementation of designated actions, such as placement at a particular location relative to the vehicle. Alternatively, decision-making can be performed locally by computing resources located on the perimeter device and/or the vehicle. Also alternatively, decision-making in response to event triggers can be performed by a combination of local and remote computing resources.

Operating the vehicle 1510 can comprise driving the vehicle by a human positioned in the vehicle, autonomous operation of the vehicle initiated by a human positioned in the vehicle, autonomous operation of the vehicle initiated by a human not positioned within the vehicle (e.g., a human located outside of the vehicle, including located at a remote location), and non-human initiated autonomous operation of the vehicle, such as operation of the vehicle initiated by a computer, such as scheduled operation and/or sensor triggered operation.

Deploying the perimeter device 1520 is accomplished by operating the UAV component of the perimeter device in accordance with the structure and function of the perimeter device. For example, if the perimeter device comprises one of the example perimeter devices described and illustrated herein, operating the UAV component of the perimeter device will be in accordance with the structure and function of that particular example perimeter device. At a minimum, deploying the perimeter device 1520 is accomplished by powering on the UAV component of the perimeter device and flying the UAV component of the perimeter device away from the vehicle and toward the predefined location.

Positioning the perimeter device 1530 at the predetermined location relative to the vehicle is accomplished in accordance with the structure and function of the perimeter device. For example, if the perimeter device comprises one of the example perimeter devices described and illustrated herein, positioning the perimeter device will be in accordance with the structure and function of that particular example perimeter device. If the perimeter device is in accordance with an embodiment in which the perimeter device is carries one or more releasable signal members, positioning the perimeter device 1530 at the predetermined location will comprise releasing one of the releasable signal members from the perimeter device to position the released signal member at the predetermined location. If the perimeter device is in accordance with an embodiment in which the perimeter device includes a non-releasable signal member, such as the embodiment illustrated in FIGS. 1-4 and the embodiment illustrated in FIGS. 5-8, positioning the perimeter device 1530 at the predetermined location will comprise operating the UAV component of the perimeter device to position the perimeter device at the predetermined location and to position the signal member in the desired orientation relative to the predetermined location and any associated base member of the perimeter device.

The steps of deploying the perimeter device 1520 and positioning the perimeter device 1520 at the predetermined location can be repeated any suitable number of times, each using a new and different predetermined location, based on the number of perimeter devices associated with the vehicle. A safety perimeter is established once a first perimeter device is positioned at a first predetermined location. Positioning additional perimeter devices and further predetermined locations modifies the initial safety perimeter to effectively create a new, or updated, safety perimeter that reflects the inclusion of the additional perimeter device.

If included, the optional step 1540 of returning the perimeter device to the vehicle can be accomplished in any suitable manner, including human transport of the perimeter device to the vehicle to reestablish the association between the perimeter device and the vehicle. Alternatively, returning the perimeter device to the vehicle can be accomplished by operating the UAV component of the perimeter device in a manner that moves the perimeter device, including the signal member component of the perimeter device, from the predetermined location to a location on the vehicle, such as a storage enclosure, charging pad, or other location on the vehicle. In these methods, operating the UAV component of the perimeter device to accomplish this step will be performed in accordance with the structural and functional characteristics of the perimeter device and, accordingly, may include folding the signal member and base member components or retrieving a previously-released signal member component.

Figure 36:
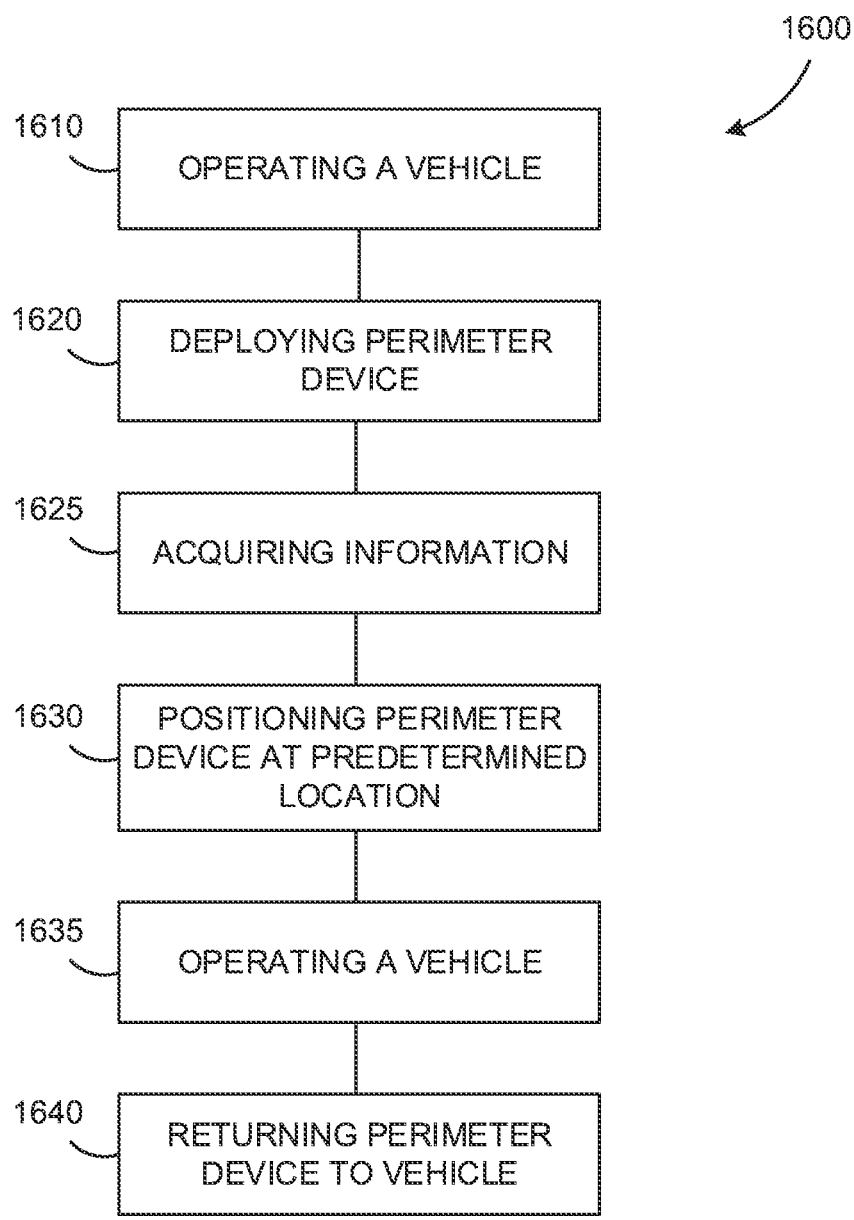
FIG. 36 is a flowchart illustration of another example method of establishing a vehicle safety perimeter.

FIG. 36 is a flowchart representation of another example method 1600 of establishing a vehicle safety perimeter. The method 1600 is similar to the method 1500 described above, except as detailed below. Thus, a first step 1610 comprises operating a vehicle having at least one perimeter device associated with the vehicle according to an embodiment of the invention, such as one of the example perimeter devices described and illustrated herein. A second step 1620 comprises deploying the perimeter device from the vehicle by operating the UAV component of the perimeter device. Another step 1625 comprises acquiring information relating to one or more situational parameters by the UAV component of the perimeter device. Another step 1630 comprises positioning the perimeter device at a predetermined location to establish the safety perimeter. An optional step 1635 comprises acquiring information relating to one more safety perimeter parameters by the UAV component of the perimeter device. An optional step 1640 comprises returning the perimeter device to the vehicle such that the perimeter device is again associated with the vehicle. The steps of deploying the perimeter device 1620 and positioning the perimeter device 1620 at the predetermined location can be repeated any suitable number of times, each using a new and different predetermined location, based on the number of perimeter devices associated with the vehicle.

Performance of the step 1625 of acquiring information relating to one or more situational parameters by the UAV component of the perimeter device is accomplished in accordance with the structure and function of the perimeter device. For example, if the perimeter device includes one or more cameras, acquiring information relating to one or more situational parameters can comprise recording still and/or video imagery of the scene near the vehicle, including the location(s) at which placement of the perimeter device (s) is/are probable or likely to be placed, a wider view of the scene, and/or views of the scene as others may view it, such as vehicles in oncoming traffic. Additional information can be acquired based on the capabilities of the perimeter device. For example, if the perimeter device includes one or more sensors, such as a temperature sensor, a humidity sensor, or other sensor, acquiring information can comprise acquiring readings from the sensor(s). Furthermore, acquiring information can comprise acquiring map-based information about the scene, including road locations, topography, traffic forecasts, historical traffic information, and the like. Any and all information, if desired, can be included in a step of defining a predetermined location for one or more perimeter devices. An optional step of adjusting the position of one or more perimeter device based on the one or more situational parameters can be included.

Performance of optional step 1635 of acquiring information relating to one or safety perimeter parameters by the UAV component of the perimeter device, if included, is accomplished in accordance with the structure and function of the perimeter device. For example, if the perimeter device includes one or more cameras, acquiring information relating to the safety perimeter parameters can comprise recording still and/or video imagery of the safety perimeter, views of the safety perimeter as others may view it, such as vehicles in oncoming traffic, and the like. Additional information can be acquired based on the capabilities of the perimeter device. For example, if the perimeter device includes one or more sensors, such as a motion sensor, a noise sensor, or other sensor, acquiring information can comprise acquiring readings from the sensor(s).

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor simply to describe and illustrate examples of the invention and are not intended to limit the scope of the invention or its protection, which is to be given the full breadth of the appended claims and any and all equivalents thereof.

I claim:

1. A vehicle, comprising:
   an external surface;
   a plurality of wheels; and
   a perimeter device comprising a signal member and a UAV, the perimeter device having a non-deployed configuration in which the UAV is in a first position relative to the signal member and a deployed configuration in which the UAV is in a second position relative to the signal member, the perimeter device disposed on the external surface in the non-deployed configuration and adapted to separate from the external surface and move to a position on a road surface adjacent said vehicle in response to a triggering event such that observers can visually detect the presence of the signal member adjacent said vehicle;

wherein the UAV has a housing, multiple support arms, and multiple propellers, each of the multiple support arms extending from the housing to one of the multiple propellers.

2. The vehicle of claim 1, wherein the signal member comprises a first triangular member.

3. The vehicle of claim 2, wherein the perimeter device further comprises a base member connected to the signal member, the base member comprising a second triangular member.

4. The vehicle of claim 3, further comprising a first connector;

wherein the first triangular member is movably connected to the second triangular member by the first connector.

5. The vehicle of claim 4, further comprising a second connector;

wherein the UAV includes a plurality of propeller shields;

wherein the UAV is movably attached to one of the base member and the signal member by the second connector.

6. The vehicle of claim 1, wherein the perimeter device further comprises a sensor.

7. The vehicle of claim 6, wherein the sensor is adapted to detect occurrence of the triggering event.

8. The vehicle of claim 1, further comprising a storage enclosure disposed on the external surface of said vehicle, the storage enclosure defining a chamber and a movable door that provides selective ingress and egress to the chamber.

9. The vehicle of claim 8, further comprising a second perimeter device disposed within the chamber, the second perimeter device comprising a second signal member, a second base member, and a second UAV.

10. The vehicle of claim 1, wherein said vehicle is a semi-trailer truck comprising a tractor unit and a trailer.

11. The vehicle of claim 10, wherein said vehicle is a partially autonomous vehicle.

12. The vehicle of claim 10, wherein said vehicle is a fully autonomous vehicle.

13. The vehicle of claim 1, wherein the triggering event is a vehicle immobilizing event.

14. The vehicle of claim 13, where the vehicle immobilizing event is selected from the group consisting of vehicle parking, vehicle impact with another object, and vehicle rollover.

15. The vehicle of claim 1, wherein the triggering event is a GPS-based event.

16. The vehicle of claim 15, wherein the GPS-based event comprises vehicle entry into a GPS-defined area.

17. The vehicle of claim 1, wherein the triggering event is an environment-based event.

18. The vehicle of claim 17, wherein the environment-based event is selected from the group consisting of detection of an elevated temperature and detection of a hazardous material.

19. A vehicle, comprising:

a tractor unit having a first plurality of wheels and a first external surface;

a trailer having a second plurality of wheels and a second external surface, the trailer connected to the tractor unit;

a storage enclosure disposed on the first external surface and defining a chamber; and a perimeter device comprising a signal member and a UAV, the perimeter device having a non-deployed configuration in which the UAV is in a first position relative to the signal member and a deployed configuration in which the UAV is in a second position relative to the signal member, the perimeter device disposed in the chamber in the non-deployed configuration and adapted to exit the chamber and move to a position on a road surface adjacent said vehicle in response to a triggering event such that observers can visually detect the presence of the signal member adjacent said vehicle;

wherein the UAV has a housing, multiple support arms, and multiple propellers, each of the multiple support arms extending from the housing to one of the multiple propellers.

20. A vehicle, comprising:

a tractor unit having a first plurality of wheels and a first external surface;

a trailer having a second plurality of wheels and a second external surface, the trailer connected to the tractor unit;

a storage enclosure disposed on the first external surface and defining a chamber; and a perimeter device comprising a signal member, a UAV, and a sensor adapted to detect a vehicle immobilizing event, the perimeter device having a non-deployed configuration in which the UAV is in a first position relative to the signal member and a deployed configuration in which the UAV is in a second position relative to the signal member, the perimeter device disposed in the chamber in the non-deployed configuration and adapted to exit the chamber in response to the sensor detecting a vehicle immobilizing event and move to a position on a road surface adjacent said vehicle such that observers can visually detect the presence of the signal member adjacent said vehicle;

wherein the UAV has a housing, multiple support arms, and multiple propellers, each of the multiple support arms extending from the housing to one of the multiple propellers.

* * * * *